(12) United States Patent
Inoue et al.

(10) Patent No.: US 8,011,792 B2
(45) Date of Patent: Sep. 6, 2011

(54) LIGHTING UNIT AND PROJECTION DISPLAY APPARATUS

(75) Inventors: Masutaka Inoue, Moriguchi (JP); Tomoya Terauchi, Moriguchi (JP)

(73) Assignee: Sanyo Electric Co., Ltd., Moriguchi-shi (JP)

(*) Notice: Subject to any disclaimer, the term of this patent is extended or adjusted under 35 U.S.C. 154(b) by 302 days.

(21) Appl. No.: 12/340,827

(22) Filed: Dec. 22, 2008

(65) Prior Publication Data

US 2009/0168029 A1    Jul. 2, 2009

(30) Foreign Application Priority Data

Dec. 28, 2007 (JP) ............... JP2007-341060
Dec. 1, 2008 (JP) ............... JP2008-306149

(51) Int. Cl.
  *G03B 21/20* (2006.01)
  *G01J 1/32* (2006.01)
  *F21V 9/00* (2006.01)

(52) U.S. Cl. ............... 353/85; 250/205; 362/230

(58) Field of Classification Search .......... 353/34, 353/85–87; 257/80–82, 88, 89; 250/204, 250/205, 552, 553; 362/230, 231, 236, 600, 362/601; 372/9, 26, 29.01, 29.014
See application file for complete search history.

(56) References Cited

U.S. PATENT DOCUMENTS 7,270,425 B2 * 9/2007 Arai et al. ............... 353/87
2010/0014000 A1 * 1/2010 Ko et al. ............... 348/603

FOREIGN PATENT DOCUMENTS

JP    07-115047 A    5/1995

* cited by examiner

*Primary Examiner* — Georgia Y Epps
*Assistant Examiner* — Don Williams
(74) *Attorney, Agent, or Firm* — Marvin A. Motsenbocker; MOTSLAW, PLLC

(57) ABSTRACT

A lighting unit includes: a light source unit 10 having a plurality of solid state light sources, a liquid crystal panel 30 displaying an image in accordance with an image input signal, a light source controlling unit 260 controlling, in accordance with the image input signal, a light amount of color component lights emitted from light source unit 10, and a speckle degree calculating unit 250 calculating a speckle degree that indicates a degree to which the color component lights generate a speckle displayed in accordance with the image input signal. The light source controlling unit 260 changes a control ratio between a first control mode and a second control mode, in accordance with the speckle degree acquired by the speckle degree calculating unit 250.

6 Claims, 16 Drawing Sheets

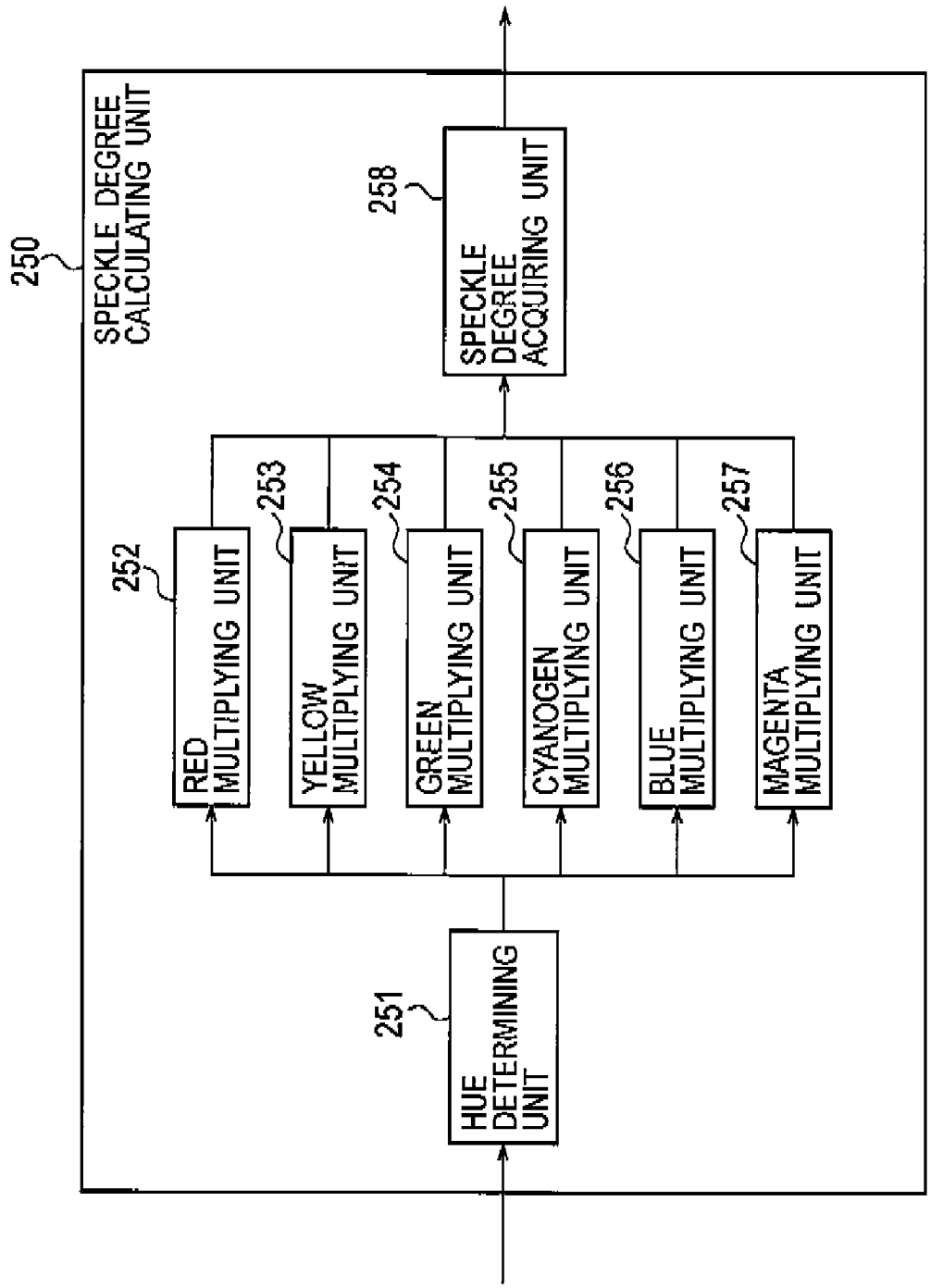

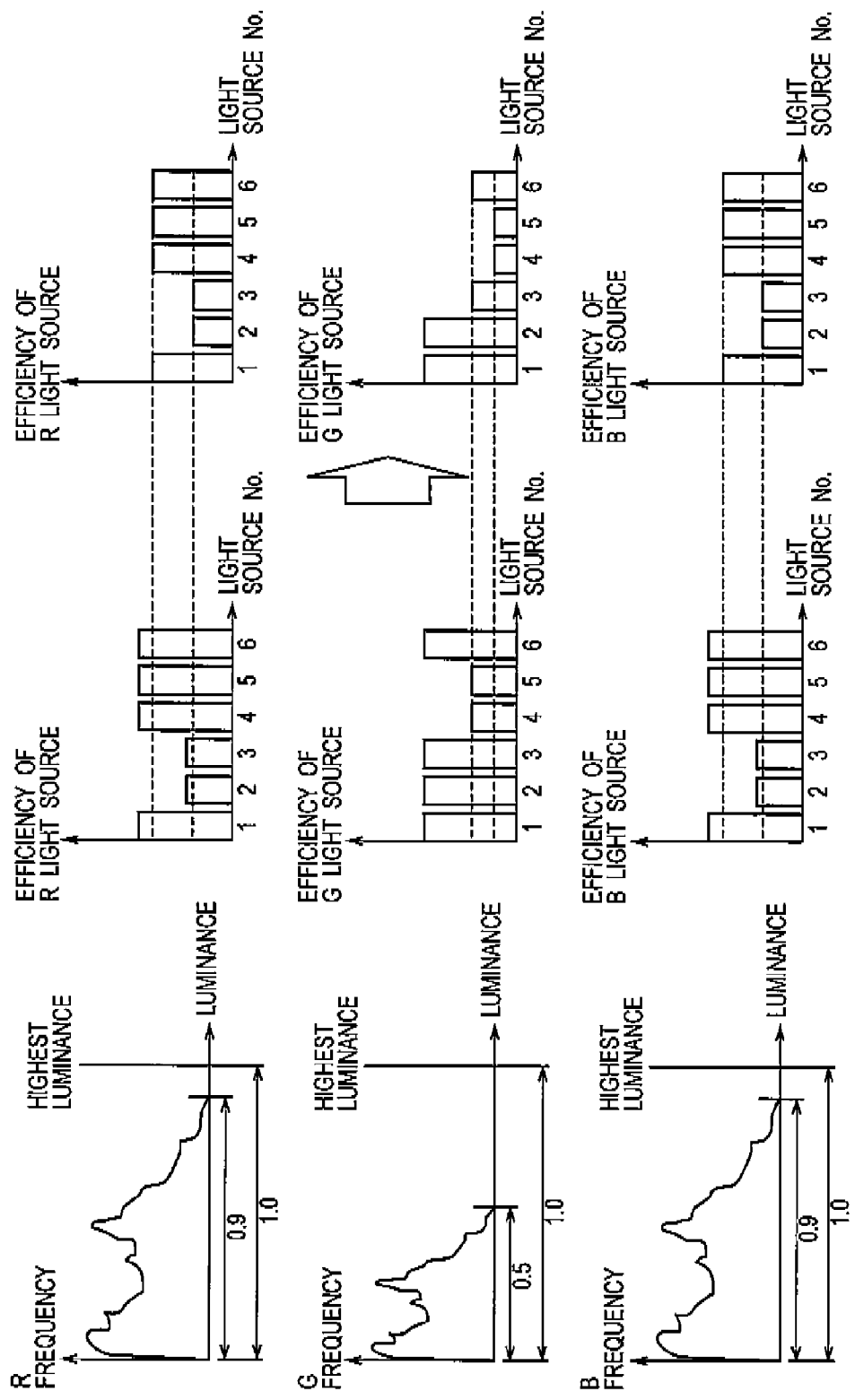

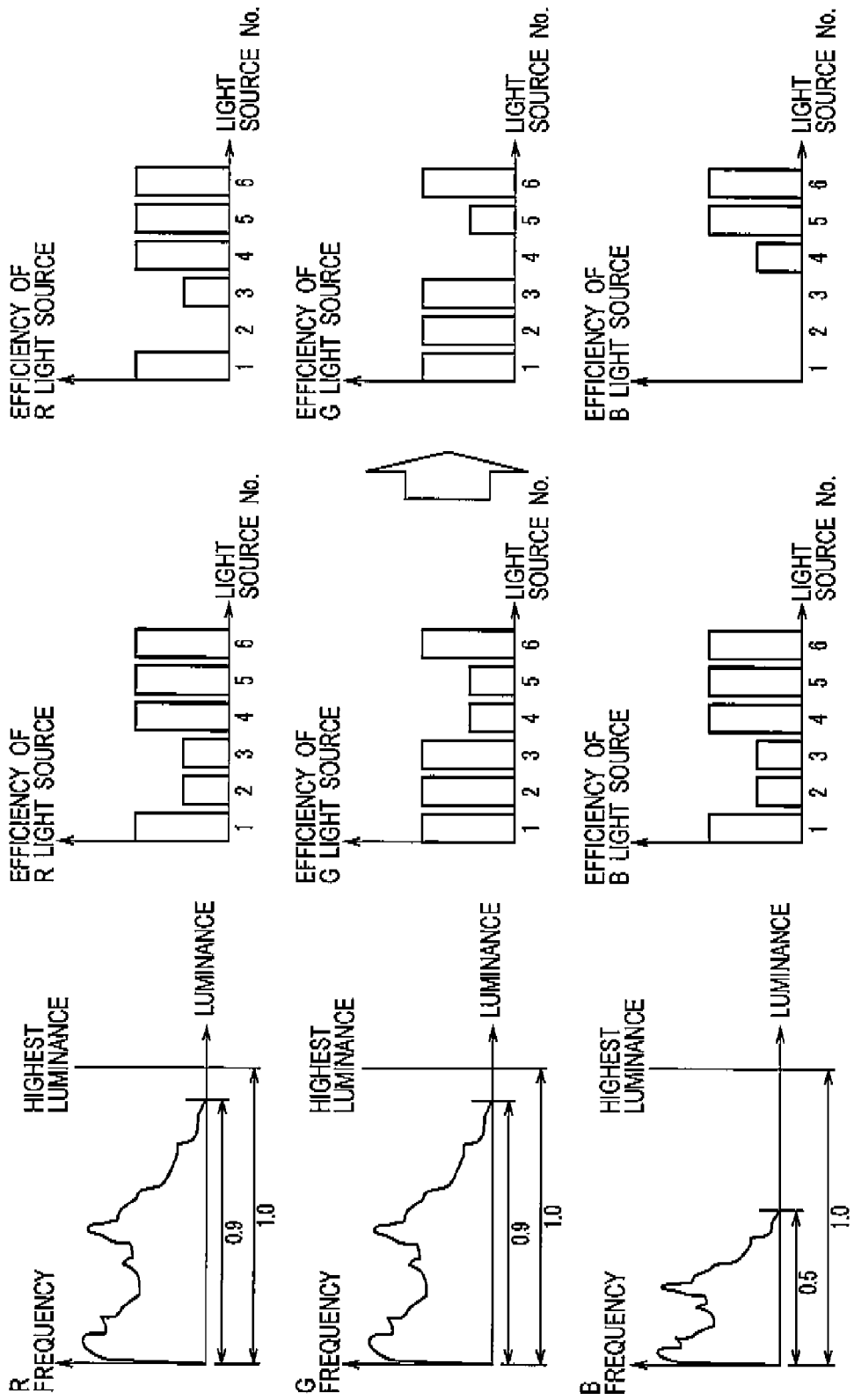

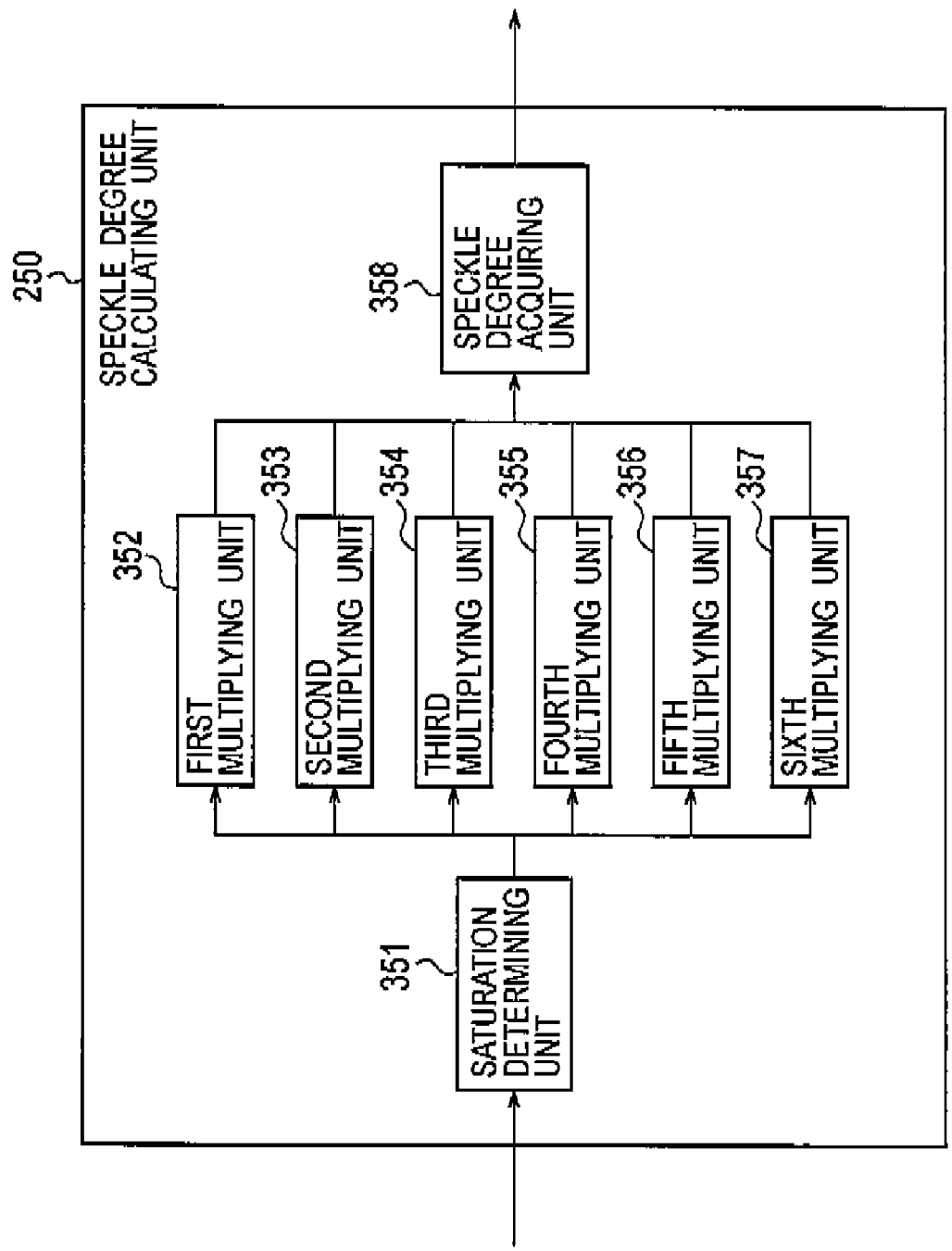

LIGHTING UNIT AND PROJECTION DISPLAY APPARATUS

CROSS REFERENCE TO RELATED APPLICATIONS

This application is based upon and claims the benefit of priority from prior Japanese Patent Application No. 2007-341060, filed on Dec. 28, 2007; and No. 2008-306149, filed on Dec. 1, 2008, the entire contents of which are incorporated herein by reference.

BACKGROUND OF THE INVENTION

1. Field of the Invention

The present invention relates to a lighting unit and a projection display apparatus, which are provided with a plurality of solid state light sources that emits same color component lights.

2. Description of the Related Art

Conventionally, a technology using a plurality of solid state light sources (for example, laser light sources) has been known for display apparatuses such as a projection display apparatus. In addition, a technology for controlling solid state light sources in accordance with the luminance of an image (hereinafter, referred to as an image adaptive type light source control) also has been known.

In the image adaptive type light source control, when the luminance of an image is low, the light amount emitted from the plurality of solid state light sources is lowered. Generally speaking, in order to lower the light amount, the electric power supplied to the plurality of solid state light sources is reduced in an ascending order of the light emission efficiency of the solid state light sources. Accordingly, the power consumption of the display apparatus can be controlled.

Incidentally, it is known that, when using the solid state light sources such as LDs (laser diodes) that emits light having equal phases, the lights emitted from the solid state light sources cause a speckle on the irradiated surface of a screen or the like. In order to moderate such speckle, a technology of adjusting the distance of the solid state light sources and the irradiated surface has been proposed (for example, Japanese Unexamined Patent Application Publication No. Hei 7-115047). generally used in the conventional technique, the electric power supplied to the solid state light source having an unfavorable light emission efficiency is reduced. In other words, there may be a case where some of the solid state light sources are turned off.

Meanwhile, lights emitted from the plurality of solid state light sources generate speckles at respectively different positions. Thus, by superposing the lights emitted from the plurality of solid state light sources on each other, the speckles caused by these lights are moderated.

However, when some of the solid state light sources are turned off because of the unfavorable light emission efficiency, among the plurality of the solid state light sources, the effect of moderating the speckle by the superposition of light beams is decreased.

SUMMARY OF THE INVENTION

A first aspect of the present invention is summarized as a lighting unit provided with a light source unit (light source unit 10) having a plurality of solid state light sources that emits same color component lights. The lighting unit includes: a light source controlling unit (light source controlling unit 260) configured to control, in accordance with an image input signal, a light amount of the same color component lights emitted from the plurality of solid state light sources, and an acquiring unit (speckle degree calculating unit 250) configured to acquire, in accordance with the image input signal, a speckle degree that indicates a degree to which the same color component lights generate a speckle in an image. The light source controlling unit includes a first control mode that averagely lowers the light amount of the same color component lights emitted from the plurality of solid state light sources, and a second control mode that preferentially lowers a light amount of a same color component light emitted from a solid state light source that has an unfavorable light emission efficiency among the plurality of solid state light sources. The light source controlling unit changes a control ratio between the first control mode and the second control mode, in accordance with the speckle degree acquired by the acquiring unit.

According to this aspect, the source controlling unit changes a control ratio between the first control mode capable of moderating a speckle and the second control mode capable of saving a power consumption, based on a degree (speckle degree) to which each color component light generates a speckle in the image. In other words, the control based on the first control mode is increased when the speckle degree is high whereas the control based on the second control mode is increased when the speckle degree is low. As a result, the speckle can be moderated while controlling the power consumption.

In the first aspect of the invention, the lighting unit further includes a storing unit (storing unit 240) configured to store, for each hue, a hue speckle degree that indicates a degree to which the same color component lights generate the speckle. The acquiring unit acquires, in accordance with the image input signal, a hue distribution included in the image, and acquires the speckle degree, based on the hue distribution and the hue speckle degree.

In the first aspect of the invention, the lighting unit further includes a storing unit (storing unit 240) configured to store, for each saturation, a saturation speckle degree that indicates a degree to which the same color component lights generate the speckle. The acquiring unit acquires, in accordance with the image input signal, a saturation distribution included in the image, and acquires the speckle degree, based on the saturation distribution and the saturation speckle degree.

In the first aspect of the invention, the lighting unit further includes a storing unit (storing unit 240) configured to store, for each luminance, a luminance speckle degree that indicates a degree to which the same color component lights generate the speckle. The acquiring unit acquires, in accordance with the image input signal, a luminance distribution included in the image, and acquires the speckle degree, based on the luminance distribution and the luminance speckle degree.

A second aspect of the present invention is summarized as a projection display apparatus, including: the lighting unit according to the first aspect of the invention; a display unit (liquid crystal panel 30) on which lights emitted from the lighting unit is irradiated; and a projection unit that projects the lights emitted from the display unit.

In the second aspect of the invention, the display unit may be a reflection type display unit (DMD530).

BRIEF DESCRIPTION OF THE DRAWINGS

FIG. 5 is a block diagram showing a speckle degree calculating unit 250 according to the first embodiment.

FIGS. 7A, 7B and 7C are graphs showing control examples of the light source unit 10 according to the first embodiment.

FIGS. 8A, 8B and 8C are graphs showing control examples of the light source unit 10 according to the first embodiment.

FIG. 9 is a block diagram showing another speckle degree calculating unit 250 according to the first embodiment.

DESCRIPTION OF THE EMBODIMENTS

Figure 1:
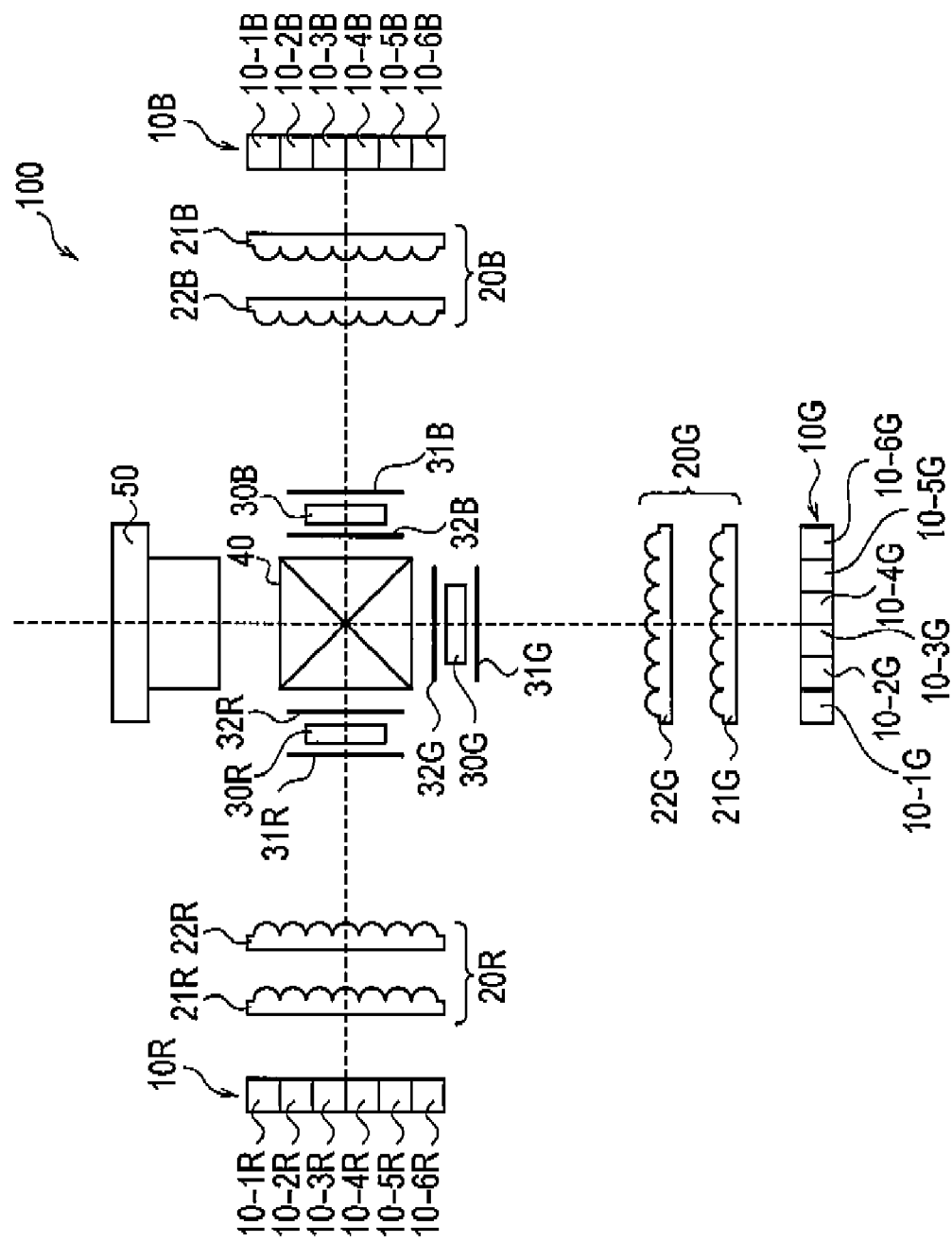
FIG. 1 is a diagram showing a configuration of a projection display apparatus 100 according to a first embodiment.

A projection display apparatus according to embodiments of the present invention will be explained below with reference to the drawings. Here, in the description of the following drawings, identical or similar portions are given the identical or similar numerals.

However, the drawings are schematic, and thus it should be noted that the proportion of each size in the drawings or the like differs from an actual ones. Therefore, particular sizes or the like should be determined in consideration of the following explanation. Further, the drawings, of course, contain items whose size or proportion differs among the drawings.

First Embodiment (Configuration of a Projection Display Apparatus)

A configuration of a projection display apparatus according to a first embodiment will be explained below with reference to the drawings. FIG. 1 is a diagram showing a configuration of a projection display apparatus 100 according to the first embodiment.

As shown in FIG. 1, the projection display apparatus 100 includes a plurality of light source units 10, a plurality of fly-eye lenses units 20, a plurality of liquid crystal panels 30, a cross dichroic prism 40, and a projection lens unit 50.

The plurality of light source units 10 includes a light source unit 10R, a light source unit 10G, and a light source unit 10B. Each of the light source units 10 is formed of a plurality of solid state light sources. Each of solid state light sources, such as an LD (laser diode), for example, emits light having equal phases. Here, the light source unit 10R is formed of a plurality of solid state light sources (10-1R to 10-6R) that emits red component light. The light source unit 10G is formed of a plurality of solid state light sources (10-1G to 10-6G) that emits green component light. The light source unit 10B is formed of a plurality of solid state light sources (10-1B to 10-6B) that emits blue component light.

Figure 2:
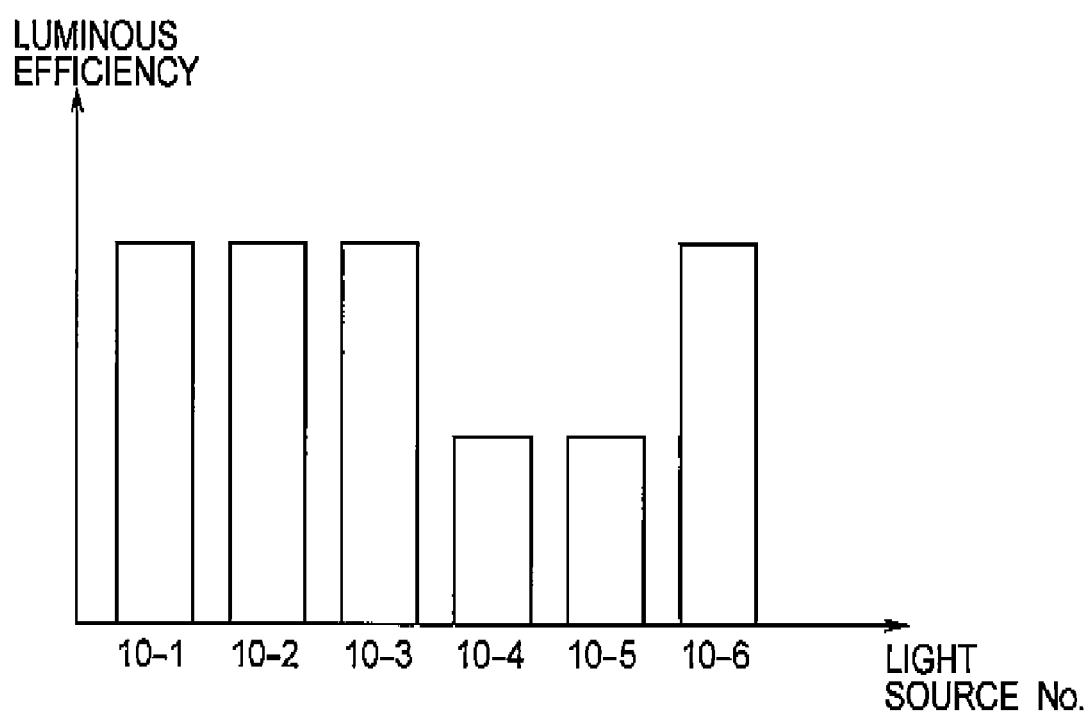
FIG. 2 is a graph showing an example of the light emission efficiency of a plurality of solid state light sources which constitute a light source unit 10 according to the first embodiment.

Here, it should be noted that, as shown in FIG. 2, the light emission efficiency of the plurality of solid state light sources which constitute the light source units 10 varies to some extent. The variation in the light emission efficiency is caused due to the manufacturing process or aging of the solid state light sources.

Note that the light emission efficiency herein is considered to be the light amount emitted from the solid state light source when a certain electric power is supplied to the solid state light source.

The plurality of fly-eye lens units 20 includes a fly-eye lens unit 20R, a fly-eye lens unit 20G, and a fly-eye lens unit 20B. Each of the fly-eye lens units 20 is formed of a fly-eye lens 21 and a fly-eye lens 22. The fly-eye lens 21 and the fly-eye lens 22 are formed of a plurality of micro lenses, respectively. Each of the micro lenses condenses the lights emitted from the light source units 10 so that the lights emitted from the light source units 10 will be irradiated to the whole surface of the corresponding liquid crystal panel 30.

The plurality of liquid crystal panels 30 includes a liquid crystal panel 30R, a liquid crystal panel 30G, and a liquid crystal panel 30B. The liquid crystal panel 30R modulates red component light by rotating the polarization direction of the red component light. At the light incident surface side of the liquid crystal panel 30R, an incident side polarizing plate 31R is provided and lets the light having one polarization direction (for example, P polarization) penetrate therethrough, and blocks the light having another polarization direction (for example, S polarization). At the light emitting surface side of the liquid crystal panel 30R, an emitting side polarizing plate 32R is provided and blocks the light having one polarization direction (for example, P polarization), and lets the light having another polarization direction (for example, S polarization) penetrate therethrough.

Similarly, the liquid crystal panels 30G and the liquid crystal panel 30B modulate green component light and blue component light by rotating the polarization directions of the green component light and the blue component light, respectively. An incident side polarizing plate 31G is provided at the light incident surface side of the liquid crystal panels 30G, and an emitting side polarizing plate 32G is provided at the light emitting surface side of the liquid crystal panels 30G. An incident side polarizing plate 31B is provided at the light incident surface side of the liquid crystal panels 30B, and an emitting side polarizing plate 32B is provided at the light emitting surface side of the liquid crystal panels 30B.

The cross dichroic prism 40 combines the lights emitted from the liquid crystal panel 30R, the liquid crystal panel 30G, and the liquid crystal panel 30B. The cross dichroic prism 40 emits combined light toward the projection lens unit 50.

The projection lens unit 50 projects, on a screen or the like, the combined light (image light) emitted from the cross dichroic prism 40.

In the first embodiment, the light source units 10, the fly-eye lens units 20, and the like constitute the "lighting unit". Note that the lighting unit does not include the liquid crystal panels 30, the cross dichroic prism 40, and the projection lens unit 50. However, the lighting unit may have the configuration including other optical elements (for example, condenser lens).

(Function of the Projection Display Apparatus)

Figure 3:
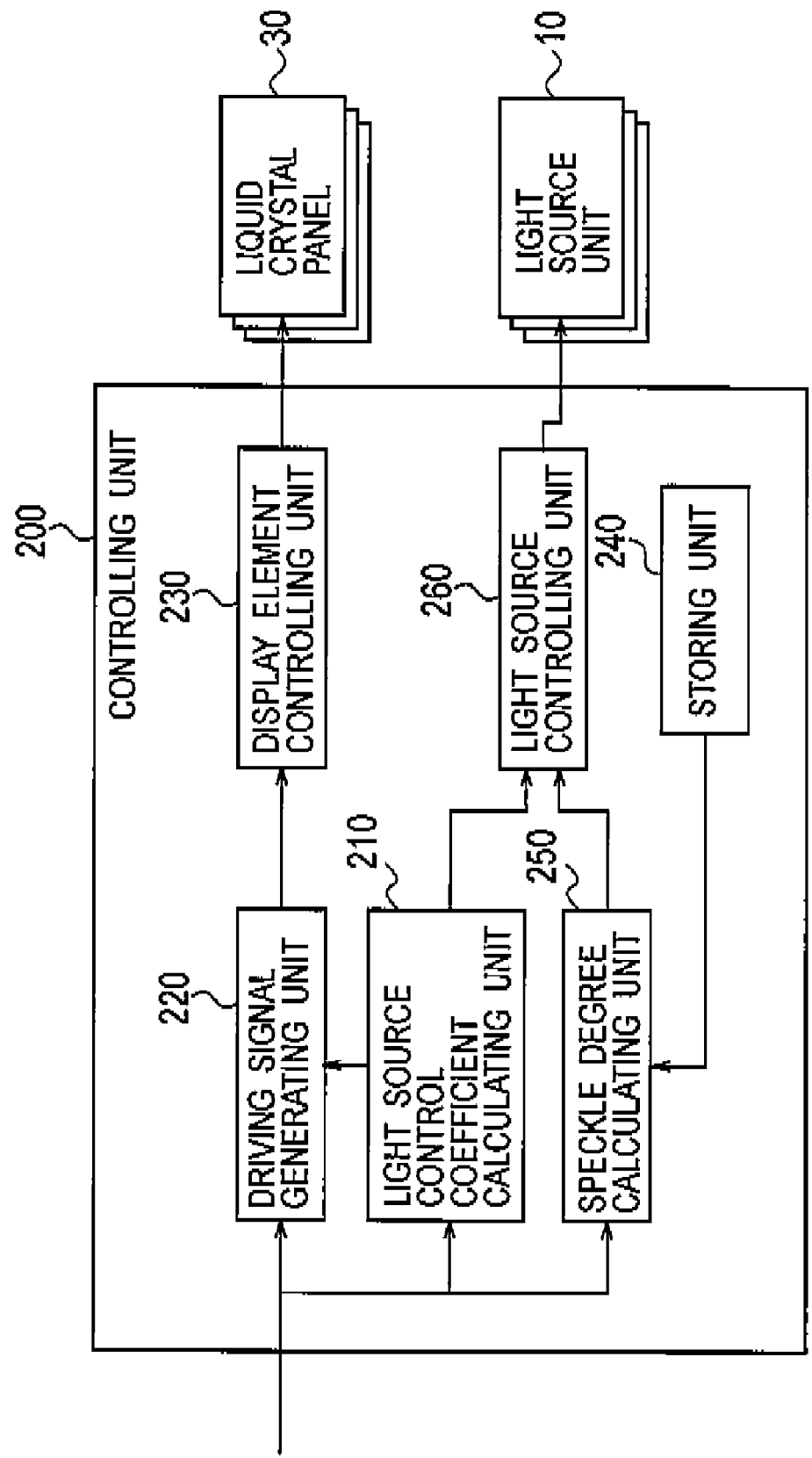
FIG. 3 is a block diagram showing a function of the projection display apparatus 100 according to the first embodiment.

Functions of the projection display apparatus (lighting unit) according to the first embodiment will be explained below with reference to the accompanying drawings. FIG. 3 is a block diagram showing the functions of the projection display apparatus 100 (controlling unit 200) according to the first embodiment.

The controlling unit 200 acquires an image input signal including a red input signal $R_{in}$, a green input signal $G_{in}$, and a blue input signal $B_{in}$. The controlling unit 200 controls, in accordance with the image input signal (image adaptive type light source control), the light amount of the color component lights emitted from the light source units 10. Further, each of the luminance of the red input signal $R_{in}$, the green input signal $G_{in}$, and the blue input signal $B_{in}$, are within the range from the minimum luminance value (for example, "0") to the allowable maximum luminance value (for example, "255").

More specifically, as shown in FIG. 3, the controlling unit 200 includes a light source control coefficient calculating unit 210, a driving signal generating unit 220, a display element controlling unit 230, a storing unit 240, a speckle degree calculating unit 250, and a light source controlling unit 260.

The light source control coefficient calculating unit 210 acquires an image input signal including a red input signal $R_{in}$, a green input signal $G_{in}$, and a blue input signal $B_{in}$. Subsequently, the light source control coefficient calculating unit 210 calculates, for each light source unit 10, a reduction rate (control coefficient) of the light amount of the color component lights emitted from the light source units 10. Incidentally, the reduction rate (control coefficient) is a value within the range from 0 to 1.

More specifically, the light source control coefficient calculating unit 210 acquires a distribution of the red input signals $R_{in}$ corresponding to the pixels included in one frame (image). Thereafter, the light source control coefficient calculating unit 210 calculates a control coefficient of the red input signals $R_{in}$ in accordance with the ratio between the maximum luminance value of the red input signal $R_{in}$ and the allowable maximum luminance value (for example, maximum luminance value/allowable maximum luminance value). Instead, the light source control coefficient calculating unit 210 may calculate the control coefficient of the red input signals $R_{in}$ in accordance with the ratio of an average value of the red input signals $R_{in}$ and the allowable maximum luminance value (for example, average value/allowable maximum luminance value). Otherwise, the light source control coefficient calculating unit 210 may calculate the control coefficient of the red input signals $R_{in}$ in accordance with the ratio between a weighted average value of the red input signals $R_{in}$ and the maximum luminance value (for example, weighted average value/allowable maximum luminance value).

The light source control coefficient calculating unit 210 calculates control coefficients of the green input signal $G_{in}$ and the blue input signal $B_{in}$ respectively, in the similar manner.

The driving signal generating unit 220 acquires the image input signal including the red input signal $R_{in}$, the green input signal $G_{in}$, and the blue input signal $B_{in}$. The driving signal generating unit 220 acquires each control coefficients of the red input signal $R_{in}$, the green input signal $G_{in}$, and the blue input signal $B_{in}$, respectively, from the light source control coefficient calculating unit 210. Subsequently, in order to compensate the reduction of the light amount of the color component lights emitted from the light source units 10, the driving signal generating unit 220 corrects the image input signals in accordance with each of the control coefficients, and generates an image output signal (driving signal).

More specifically, the driving signal generating unit 220 multiplies the red input signal $R_{in}$ by the reciprocal of the control coefficient of the red input signal $R_{in}$, thereby acquiring a red output signal $R_{out}$. Similarly, the driving signal generating unit 220 multiplies the green input signal $G_{in}$ by the reciprocal of the control coefficient of the green input signal $G_{in}$, thereby acquiring a green output signal $G_{out}$. Further, the driving signal generating unit 220 multiplies the blue input signal $B_{in}$ by the reciprocal of the control coefficient of the blue input signal $B_{in}$, thereby acquiring a blue output signal $B_{out}$.

In this manner, the driving signal generating unit 220 generates the image output signal (driving signal) including the red output signal $R_{out}$, the green output signal $G_{out}$, and the blue output signal $B_{out}$.

The display element controlling unit 230 acquires the image output signal (driving signal) including the red output signal $R_{out}$, the green output signal $G_{out}$, and the blue output signal $B_{out}$ from the driving signal generating unit 220. The display element controlling unit 230 controls each of the liquid crystal panels 30 in accordance with the image output signal (driving signal).

The storing unit 240 stores, for each color component light, a hue speckle degree that indicates a degree to which the color component lights emitted from the light source units 10 generates a speckle.

In this regard, the hue speckle degree is a value within the range from 0 to 1. The hue speckle degree "1" means that a speckle is likely to occur, whereas the hue speckle degree "0" means that a speckle is unlikely to occur.

(Calculation for Hue Speckle Degree)

Hereinafter, with reference to FIGS. 4A and 4b, description will be given for the degree to which the red component lights emitted from the light source unit 10R generate speckles, for each hue (hereinbelow, such degree is referred to as a hue speckle degree R).

Figure 4A:
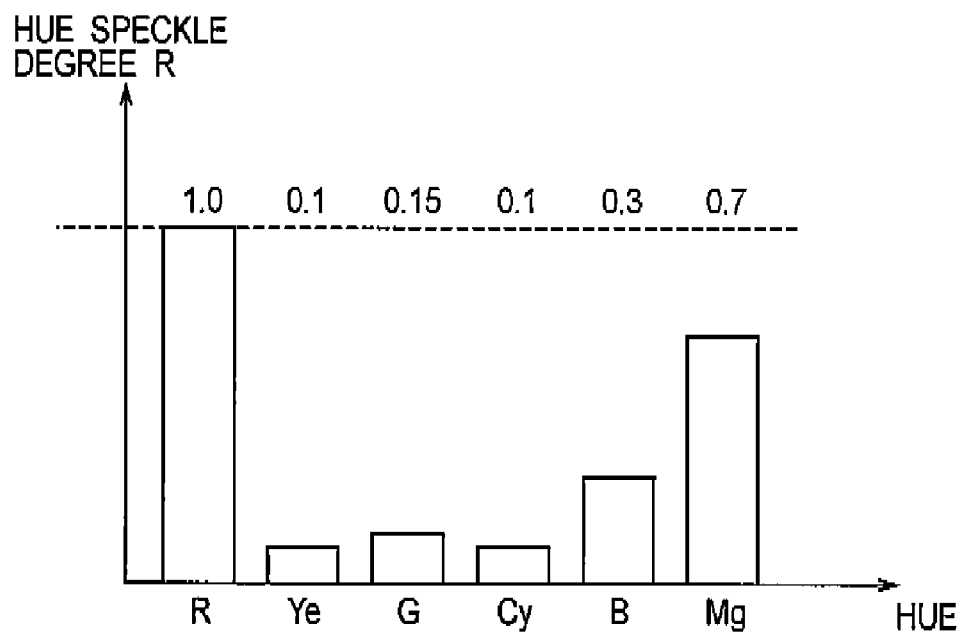
FIGS. 4A and 4B are graphs each showing an example of a hue speckle degree according to the first embodiment.

FIG. 4A is a graph showing the hue speckle degree R acquired through a speckle contrast measurement. As shown in FIG. 4A, the hue speckle degree R is the highest in a red hue R, and the hue speckle degree R is the second highest in a magenta hue Mg. Meanwhile, the hue speckle degree R is relatively low in a yellow hue Ye, a green hue G, a cyan hue Cy, and a blue hue B.

Figure 4B:
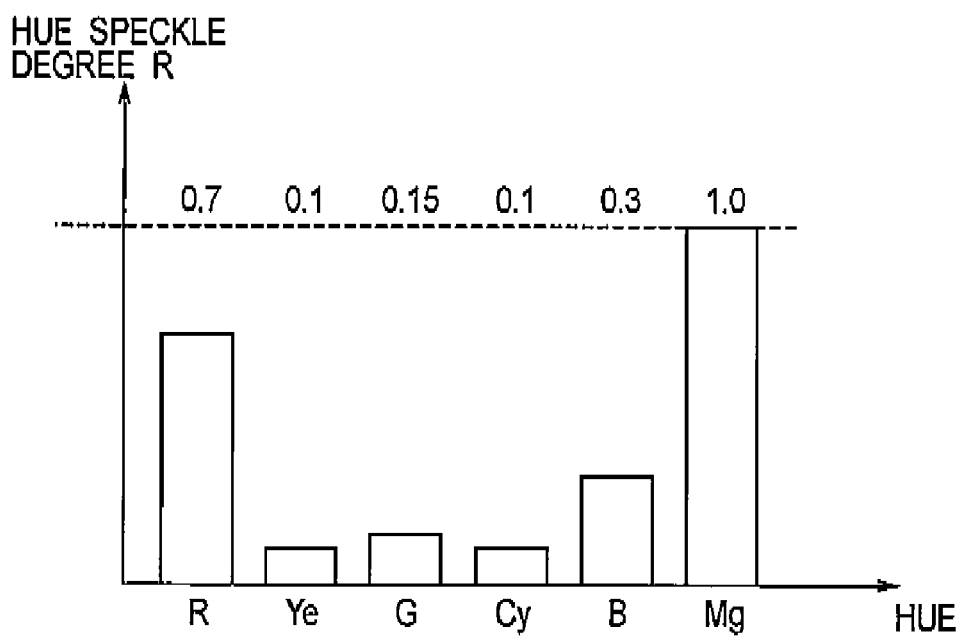

FIG. 4B is a graph showing the hue speckle degree R acquired through a subjective evaluation. As shown in FIG. 4B, the hue speckle degree R is the highest in the magenta hue Mg, and the hue speckle degree R is the second highest in the red hue R. Meanwhile, the hue speckle degree R is relatively low in the yellow hue Ye, the green hue G, the cyan hue Cy, and the blue hue B.

Although it is described above that a speckle is unlikely to occur when the hue speckle degree is "0," the hue speckle degree of 0.3 is considered to be measured due to a noise by the asperity of a screen or the like. Accordingly, it should be understood that, if the hue speckle degree is 0.3 or less, a speckle is almost not visually recognized.

Additionally, note that the storing unit 240 stores, for each hue, a hue speckle degree to which the green component lights emitted from the light source unit 10G (hue speckle degrees G) generate a speckle. Similarly, the storing unit 240 stores, for each hue, degrees to which the blue component lights emitted from the light source unit 10B generate a speckle (hue speckle degrees B).

The speckle degree calculating unit 250 calculates, for each color component light, the speckle degree that indicates a degree to which the color component lights emitted from the light source units 10e generate a speckle in the frame (image) that is displayed in accordance with the image input signal. In other words, the speckle degree calculating unit 250 calculates a speckle degree of the red component light, a speckle degree of the green component light, and a speckle degree of the blue component light, respectively.

More specifically, the speckle degree calculating unit 250 includes a hue determining unit 251, a red multiplying unit 252, a yellow multiplying unit 253, a green multiplying unit 254, a cyan multiplying unit 255, a blue multiplying unit 256, a magenta multiplying unit 257, and a speckle degree acquiring unit 258, as shown in FIG. 5.

The hue determining unit 251 acquires the image input signal including the red input signal $R_{in}$, the green input signal $G_{in}$, and the blue input signal $B_{in}$. Subsequently, the hue determining unit 251 determines the hue corresponding to the pixels included in the frame (image). In this manner, the hue determining unit 251 acquires a hue distribution included in the frame (image).

The red multiplying unit 252 multiplies a ratio R of a red hue included in the frame (image), by the red hue speckle degree. Note that the red multiplying unit 252 calculates a multiplication result for each color component light.

The yellow multiplying unit 253 multiplies a ratio Ye of a yellow hue included in the frame (image), by the yellow hue speckle degree. Note that the yellow multiplying unit 253 calculates a multiplication result for each color component light.

The green multiplying unit 254 multiplies a ratio G of a green hue included in the frame (image), by the green hue speckle degree. Note that the green multiplying unit 254 calculates a multiplication result for each color component light.

The cyan multiplying unit 255 multiplies a ratio Cy of a cyan hue included in the frame (image) by the cyan hue speckle degree. Note that the cyan multiplying unit 255 calculates a multiplication result for each color component light.

The blue multiplying unit 256 multiplies a ratio B of a blue hue included in the frame (image), by the blue hue speckle degree. Note that the blue multiplying unit 256 calculates a multiplication result for each color component light.

The magenta multiplying unit 257 multiplies a ratio Mg of a magenta hue included in the frame (image) by the magenta hue speckle degree. Note that the magenta multiplying unit 257 calculates a multiplication result for each color component light.

The hue speckle degrees used by the red multiplying unit 252 to the magenta multiplying unit 257 described above may be the hue speckle degrees acquired through a speckle contrast measurement (see FIG. 4A), or may be the hue speckle degrees acquired through a subjective evaluation (see FIG. 4B).

The speckle degree acquiring unit 258 acquires the multiplication results calculated by the red multiplying unit 252 to the magenta multiplying unit 257 as described above. The speckle degree acquiring unit 258 acquires a speckle degree by adding the above-described multiplication results together. Incidentally, the speckle degree acquiring unit 258 acquires the speckle degree for each color component light.

The light source controlling unit 260 controls the light amount of the color component lights emitted from the light source units 10, based on the control coefficient calculated by the light source control coefficient calculating unit 210.

More specifically, the light source controlling unit 260 multiplies the maximum light amount of the light source unit 10R by the control coefficient of the red input signal $R_{in}$, and then determines a light amount (target light amount R) of the red component lights emitted from the light source unit 10R. Similarly, the light source controlling unit 260 multiplies the maximum light amount of the light source unit 10G by the control coefficient of the green input signal $G_{in}$, and then determines a light amount (target light amount G) of the green component lights emitted from the light source unit 10G. The light source controlling unit 260 multiplies the maximum light amount of the light source unit 10B by the control coefficient of the blue input signal $B_{in}$, and then determines a light amount (target light amount B) of the blue component lights emitted from the light source unit 10B.

Here, the maximum light amount indicates the amount of lights emitted from the light source units 10, when the maximum power is supplied to the plurality of solid state light sources which constitute the light source units 10.

In this regard, the light source controlling unit 260 has the following two control modes (a first control mode and a second control mode) for controlling the light source units 10 in order that the light amount of the color component lights emitted from the light source units 10 becomes the target light amount.

The first control mode is a control mode which averagely lowers the light amount of the color component lights emitted from the plurality of solid state light sources constituting the light source units 10. For example, the reduction quantity of the light amount of the color component lights emitted from the solid state light sources is a value obtained by dividing the difference between the maximum light amount and the target light amount by the number of the solid state light sources.

The second control mode is a control mode which preferentially lowers the light amount of the color component light emitted from a solid state light source having an unfavorable light emission efficiency among the plurality of solid state light sources which constitute the light source units 10. For example, in the case where the light source units 10 are formed of the solid state light sources shown in FIG. 2, the light amount emitted from the solid state light source 10-4 and the solid state light source 10-5 are preferentially lowered.

The light source controlling unit 260 changes the control ratio of the first control mode and the second control mode, in accordance with the speckle degree calculated by the speckle degree calculating unit 250. More specifically, the light source controlling unit 260 changes the control ratio between the first control mode and the second control mode with respect to the light source unit 10R, in accordance with the speckle degree of the red component light. Similarly, the light source controlling unit 260 changes the control ratio between the first control mode and the second control mode with respect to the light source unit 10G, in accordance with the speckle degree of the green component light. The light source controlling unit 260 changes the control ratio between the first control mode and the second control mode with respect to the light source unit 10B, in accordance with the speckle degree of the blue component light.

Figure 6A:
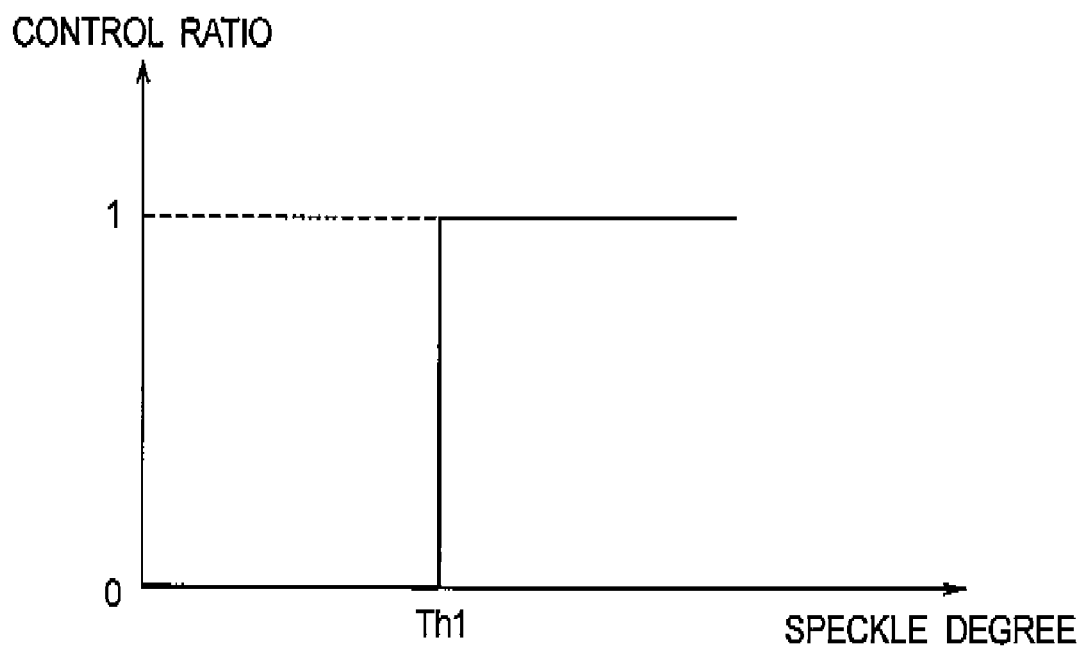
FIGS. 6A and 6B are graphs each showing an example of a control ratio of a first control mode and a second control mode according to the first embodiment.
Figure 6B:
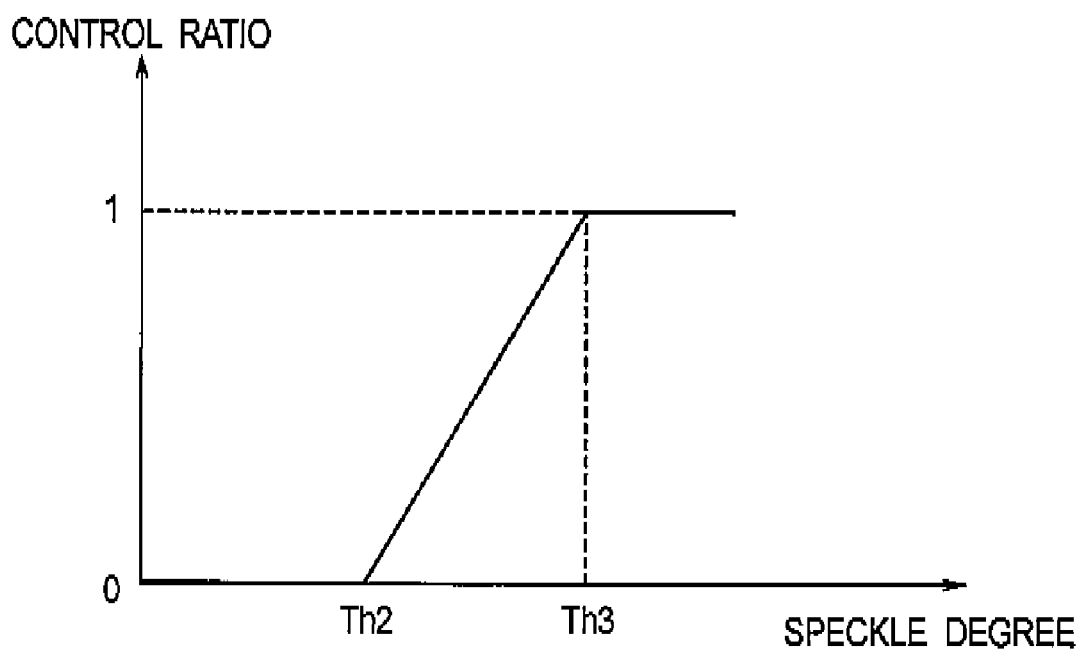

With reference to FIGS. 6A and 6B, the control ratio between the first control mode and the second control mode will be described below. Incidentally, in FIGS. 6A and 6B, the vertical axis indicates the control ratio of the first control mode.

The light source controlling unit 260 may switch between the first control mode and the second control mode according to whether or not the speckle degree exceeds a threshold value Th1 (for example, 0.5), as shown in FIG. 6A. In other words, when the speckle degree exceeds the threshold value Th1, the light source controlling unit 260 controls the light source units 10 based on the first control mode. On the other hand, when the speckle degree is less than the threshold value Th1, the light source controlling unit 260 controls the light source units 10 based on the second control mode.

The light source controlling unit 260 may combine the first control mode and the second control mode, as shown in FIG. 6B. More specifically, when the speckle degree exceeds a threshold value Th3 (for example, 0.7), the light source controlling unit 260 controls the light source units 10 based on the first control mode. On the other hand, when the speckle degree is less than a threshold value Th2 (for example, 0.3), the light source controlling unit 260 controls the light source units 10 based on the second control mode.

When the speckle degree falls between the threshold value Th2 and the threshold value Th3, the light source controlling unit 260 controls the light source units 10 based on the combination of the first control mode and the second control mode. Note that the control ratio of the first control mode becomes higher as the speckle degree becomes high.

(Control Examples of the Light Source Unit 10)

Control examples of the light source unit 10 according to the first embodiment will be explained below with reference to the accompanying drawings. FIGS. 7A to 7C and FIGS. 8A to 8C are graphs showing control examples of the light source unit 10 according to the first embodiment.

Incidentally, in FIGS. 7A to 7C and FIGS. 8A to 8C, for simplifying the explanation, the speckle degree of the red component light is referred to in controlling each of the light source units 10. Therefore, the speckle degree of the red component light is referred to even in the case of controlling the light source unit 10G and the light source unit 10B.

First, with reference to FIGS. 7A to 7C, a description will be given for a case where a large portion of magenta hue is included in a frame (image) that is displayed in accordance with an image input signal.

When a large portion of magenta hue is included in the frame (image), as shown in FIG. 7A, the green input signal $G_{in}$ inclines toward its low-luminance side, compared to the red input signal $R_{in}$ and the blue input signal $B_{in}$. The control coefficients (maximum luminance value/allowable maximum luminance value) of the red input signal $R_{in}$ and the blue input signal $B_{in}$ are "0.9," respectively. The control coefficient (maximum luminance value/allowable maximum luminance value) of the green input signal $G_{in}$ is "0.5."

Here, it is assumed that FIG. 7B represents the light emission efficiency of the solid state light sources respectively constituting the light source unit 10R, the light source unit 10G, and the light source unit 10B. For the light source unit 10R and the light source unit 10B, the light quantities emitted from the light source unit 10R and the light source unit 10B need to be decreased by the difference between the maximum light amount and the target light amount (i.e., maximum light amount×(1−0.9)). Meanwhile, for the light source unit 10G, the light amount emitted from the light source unit 10G needs to be decreased by the difference between the maximum light amount and the target light amount (i.e., maximum light amount×(1−0.5)).

Incidentally, the speckle degree is a high value (for example, 0.7) when a large portion of magenta hue is included in the frame (image), as apparent from the hue speckle degree shown in FIG. 4A or FIG. 4B.

Therefore, each of the light source units 10 is controlled based on the first control mode. In other words, as shown in FIG. 7C, the light amount emitted from the plurality of solid state light sources which constitute the light source units 10 is averagely decreased.

Next, with reference to FIGS. 8A to 8C, a description will be given for a case where a large portion of yellow hue is included in a frame (image) that is displayed in accordance with an image input signal.

When a large portion of yellow hue is included in the frame (image), as shown in FIG. 8A, the blue input signal $B_{in}$ inclines toward the low-luminance side, compared with the red input signal $R_{in}$ and the green input signal $G_{in}$. The control coefficients (maximum luminance value/allowable maximum luminance value) of the red input signal $R_{in}$ and the green input signal $G_{in}$ are "0.9," respectively. The control coefficient (maximum luminance value/allowable maximum luminance value) of the blue input signal $B_{in}$ is "0.5".

Here, it is assumed that FIG. 8B represents the light emission efficiency of the solid state light sources respectively constituting the light source unit 10R, the light source unit 10G, and the light source unit 10B. For the light source unit 10R and the light source unit 10G, the light amount emitted from the light source unit 10R and the light source unit 10G needs to be decreased by the difference between the maximum light amount and the target light amount (i.e. maximum light amount×(1−0.9)). Meanwhile, with the light source unit 10B, the light amount emitted from the light source unit 10B needs to be decreased by the difference between the maximum light amount and the target light amount (i.e. maximum light amount×(1−0.5)).

Incidentally, the speckle degree is a low value (for example, 0.3), when a large portion of yellow hue is included in the frame (image), as apparent from the hue speckle degree shown in FIG. 4A or FIG. 4B.

Therefore, each of the light source units 10 is controlled based on the second control mode. In other words, as shown in FIG. 8C, the light amount of the color component light emitted from the solid state light source that has a low light emission efficiency, among the plurality of solid state light sources constituting the light source units 10, is preferentially lowered.

For instance, using the light source unit 10R as an example, the light amount emitted from the solid state light source of No. 2 having low light emission efficiency becomes "0." Using the light source unit 10G as an example, the light amount emitted from the solid state light source of No. 4 having low light emission efficiency becomes "0."

Using the light source unit 10B as an example, the light quantities emitted from the solid state light sources of No. 2 and No. 3 having low light emission efficiencies become "0." Moreover, in order to decrease the light amount emitted from the light source unit 10B, the light quantities emitted from the solid state light sources of No. 1 and No. 4 are lowered.

(Operation and Effect)

In the first embodiment the light source controlling unit 260 changes the control ratio between the first control mode capable of moderating a speckle and the second control mode capable of saving a power consumption, based on a degree (speckle degree) to which each color component light generates a speckle in the image. In other words, the control based on the first control mode is increased when the speckle degree is high whereas the control based on the second control mode is increased when the speckle degree is low. As a result, the speckle can be moderated while controlling the power consumption.

The speckle degree calculating unit 250 calculates the speckle degree based on the multiplication result of the ratio of each hue included in the frame (image) and each hue speckle degree. Therefore, the calculation accuracy of the speckle degree can be enhanced compared to a case where the speckle degree is calculated simply based on the characteristics of each of the plurality of solid state light sources constituting the light source units 10.

(Calculation of a Saturation Speckle Degree)

Hereinbelow, with reference to the accompanying drawings, a description will be given for a calculation of a speckle degree based on the saturation degree instead of the hue. The difference between the hue speckle degree and the saturation speckle degree will be mainly explained below.

The hue speckle degree is calculated based on the hue distribution included in an image (frame). On the other hand, the saturation speckle degree is calculated based on the saturation distribution included in the image (frame).

A speckle degree calculating unit using the saturation will be explained below with reference to the accompanying drawings. FIG. 9 is a block diagram showing a speckle degree calculating unit 250 using the saturation.

As shown in FIG. 9, the speckle degree calculating unit 250 includes, instead of the hue determining unit 251 a saturation determining unit 351, a first multiplying unit 352 to a sixth multiplying unit 357, and a speckle degree acquiring unit 358.

The saturation determining unit 351 acquires an image input signal including a red input signal $R_{in}$, a green input signal $G_{in}$, and a blue input signal $B_{in}$. Subsequently, the saturation determining unit 351 determines saturation degrees of each pixels included in the frame (image). With this, the saturation determining unit 351 acquires a saturation distribution included in the frame (image).

Here, it is assumed that the storing unit 240 stores a saturation speckle degree for each color component light. The saturation speckle degree herein indicates, for each saturation degree (a first saturation degree to a sixth saturation degree), a degree to which the color component lights emitted from the light source units 10 generate the speckle. Note that the first to sixth saturation degrees indicate respectively different degrees of saturation in the descending order. In other words, the saturation at the first saturation degree is the highest and the saturation at the sixth saturation degree is the lowest.

The first multiplying unit 352 to the sixth multiplying unit 357 multiply the ratio of the first saturation degree to the sixth saturation degree included in the frame (image), by the saturation speckle degrees of the first saturation degree to the sixth saturation degree, respectively, in a similar way as the red multiplying unit 252 to the magenta multiplying unit 257 as described above.

The speckle degree acquiring unit 358 acquires multiplication results calculated by the first multiplying unit 352 to the sixth multiplying unit 357 in a similar way as the speckle degree acquiring unit 258. The speckle degree acquiring unit 358 acquires a speckle degree by adding the above-described multiplication results together.

(Calculation of a Luminance Speckle)

Hereinbelow, with reference to the accompanying drawings, a description will be given for a calculation of a speckle degree based on the luminance degree instead of the hue. The difference between the hue speckle degree and the luminance speckle degree will be mainly explained below.

The hue speckle degree is calculated based on the hue distribution included in an image (frame). On the other hand, the luminance speckle degree is calculated based on the luminance distribution included in the image (frame).

Figure 10:
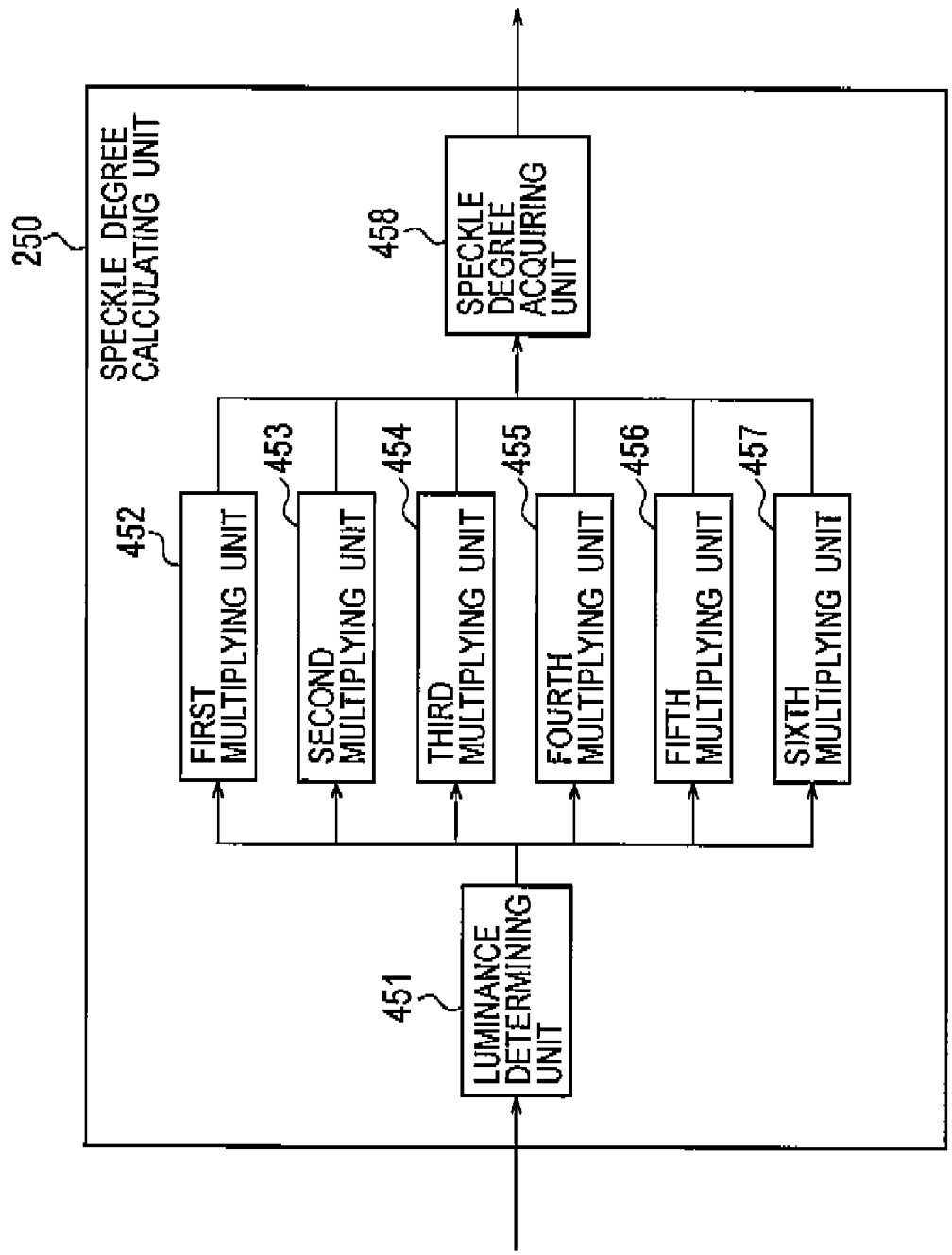
FIG. 10 is a block diagram showing still another speckle degree calculating unit 250 according to the first embodiment.

A speckle degree calculating unit using the luminance will be explained below with reference to the accompanying drawings. FIG. 10 is a block diagram showing a speckle degree calculating unit 250 using the saturation.

As shown in FIG. 10, the speckle degree calculating unit 250 includes, instead of the hue determining unit 251, a luminance determining unit 451 instead of the hue determining unit 251, a first multiplying unit 452 to a sixth multiplying unit 457, and a speckle degree acquiring unit 458.

The luminance determining unit 451 acquires an image input signal including a red input signal $R_{in}$, a green input signal $G_{in}$, and a blue input signal $B_{in}$. Subsequently, the luminance determining unit 451 determines luminance degrees of each pixels included in the frame (image). With this, the luminance determining unit 451 acquires a luminance distribution included in the frame (image).

Here, it is assumed that the storing unit 240 stores a luminance speckle degree for each color component light. The luminance speckle degree herein indicates, for each luminance degree (a first luminance degree to a sixth luminance degree), a degree to which the color component lights emitted from the light source units 10 generate the speckle. Note that the first to sixth saturation degrees indicate respectively different degrees of luminance in descending order. In other words, the luminance at the first luminance degree is the highest and the luminance at the sixth luminance degree is the lowest.

The first multiplying unit 452 to the sixth multiplying unit 457 multiply the ratio of the first luminance degree to the sixth luminance degree included in the frame (image), by the luminance speckle degrees of the first luminance degree to the sixth luminance degree, respectively, in a similar way as the red multiplying unit 252 to the magenta multiplying unit 257 as described above.

The speckle degree acquiring unit 458 acquires multiplication results calculated by the first multiplying unit 452 to the sixth multiplying unit 457 in a similar way as the speckle degree acquiring unit 258. The speckle degree acquiring unit 458 acquires a speckle degree by adding the above-described multiplication results together.

Second Embodiment (Composition of a Projection Display Apparatus)

Figure 11:
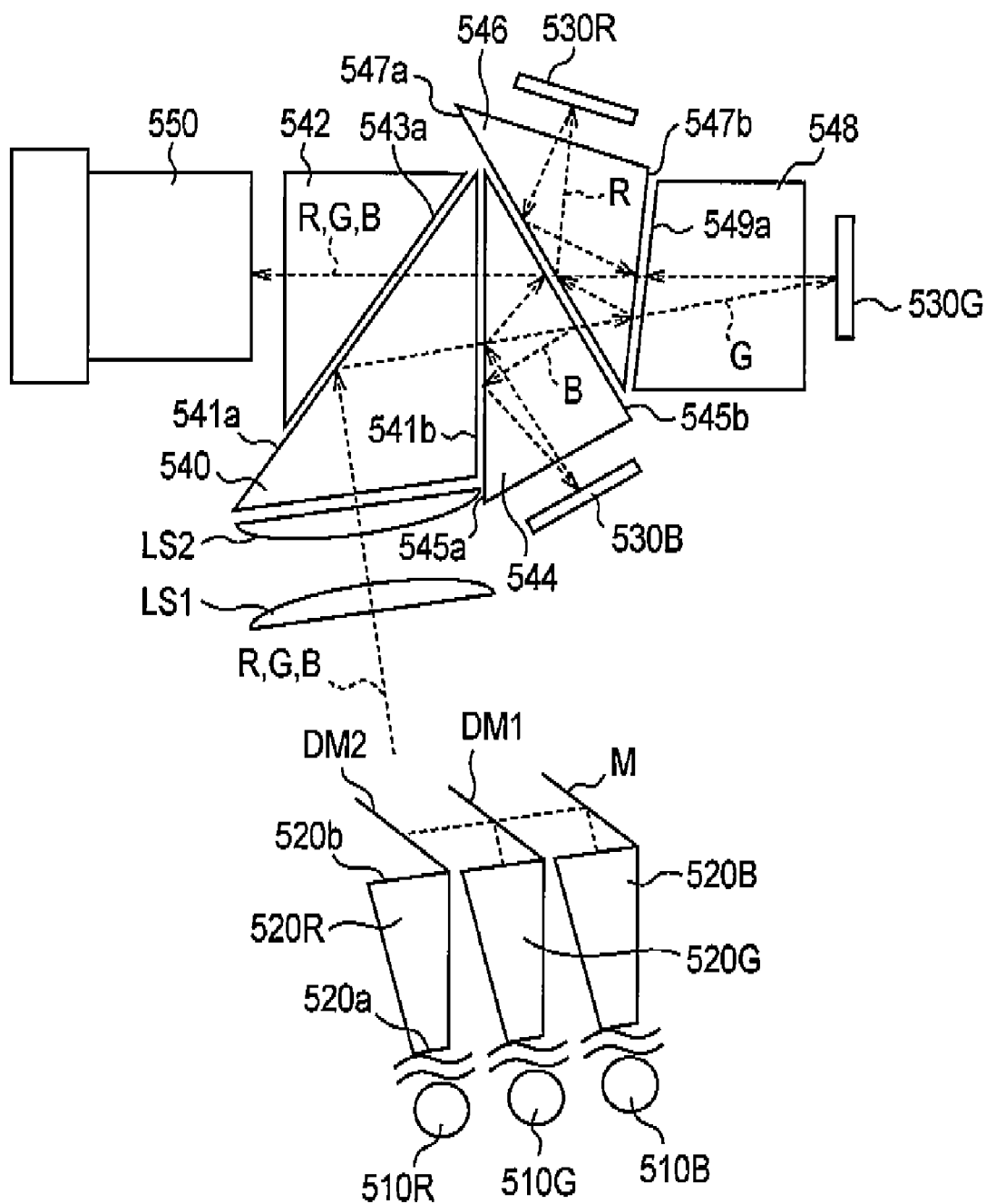
FIG. 11 is a diagram showing a configuration of a projection display apparatus 600 according to a second embodiment.

A configuration of a projection display apparatus according to a second embodiment will be explained below with reference to the accompanying drawings. FIG. 11 is a diagram showing a configuration of a projection display apparatus 600 according to the second embodiment. The difference between the first embodiment and the second embodiment will be mainly explained below.

As shown in FIG. 11 the projection display apparatus 600 includes a plurality of light source units 510, a plurality of rod integrators 520, a plurality of DMDs (digital micromirror devices) 530, a TIR (total internal reflection) prism 540, and a projection lens unit 550.

The plurality of light source units 510 includes a light source unit 510R, a light source unit 510G, and a light source unit 510B. Each of the light source units 510 includes a plurality of solid state light sources.

Here, the light source unit 510R includes six solid state light sources emitting unillustrated red component light, and six optical fibers leading the red component light from the respective solid state light sources to the incident surface of a rod integrator 520R. The light source unit 510G includes six solid state light sources emitting unillustrated green component light, and six optical fibers leading the green component light from the respective solid state light sources to the incident surface of a rod integrator 520G. The light source unit 510B includes six solid state light sources emitting unillustrated blue component light, and six optical fibers leading the blue component light from the respective solid state light sources to the incident surface of a rod integrator 520B.

The plurality of rod integrators 520 includes the rod integrator 520R, the rod integrator 520G, and the rod integrator 520B. Each of the rod integrators 520 is configured in a way that a cross sectional area thereof becomes larger from an incident surface 520a towards an emitting surface 520b. The rod integrators 520 uniformize the lights emitted from the light source units 510 so that the lights emitted from the light source units 510 may irradiate the whole surfaces of the DMDs 530.

The plurality of DMDs 530 includes a DMD 530R, a DMD 530G, and a DMD 530B. The DMD 530R modulates the red component light by reflecting the red component light. Similarly, the DMD 530G and the DMD 530B modulate the green component light and the blue component light by reflecting the green component light and the blue component light, respectively.

A mirror M, a dichroic mirror DM1, and a dichroic mirror DM2 combine the light emitted from the plurality of rod integrators 520. Lenses LS1 and LS2 are condenser lenses which substantially parallelize the light from the light source units 510 so that each color component light irradiates the DMDs 530.

The TIR prism 540 is formed of a light transmission member, and includes a surface 541a and a surface 541b. An air gap is provided between the TIR prism 540 (surface 541a) and a prism 542 (plane 543a). Since the angle (incident angle) at which the light from each of the light source units 510 enters the surface 541a is larger than an angle at which total internal reflection occurs(hereinafter referred to as a total reflection angle), the light from the light source units 510 is reflected on the surface 541a. On the other hand, although an air gap is provided between the TIR prism 540 (surface 541b) and a prism 544 (surface 545a), the light reflected on the surface 541a penetrates the surface 545a, since the angle at which the light from each of the light source units 510 enters the surface 541b is smaller than the total reflection angle.

The prism 542 is formed of a light transmission member and includes the surface 543a.

The prism 544 is formed of a light transmission member and includes the surface 545a and a surface 545b. An air gap is provided between the TIR prism 540 (surface 545b) and the prism 544 (surface 545a). Since the blue component light reflected on the surface 545b and the blue component light emitted from the DMD 530B enter the surface 545a at a larger angle than the total reflection angle, the blue component light reflected on the surface 545b and the blue component light emitted from the DMD 530B are reflected on the surface 545a.

The surface 545b is a dichroic filter surface that is penetrated by the red component light and the green component light, and that reflects the blue component light. Therefore, among the light reflected on the surface 541a, the red component light and the green component light penetrate the surface 545b whereas the blue component light is reflected on the surface 545b. The blue component light reflected on the surface 545a is reflected on the surface 545b.

A prism 546 is formed of a light transmission member and includes a surface 547a and a surface 547b. An air gap is provided between the prism 544 (surface 545b) and the prism 546 (surface 547a). Since the red component light reflected on the surface 547b and the red component light emitted from the DMD 530R enter the surface 547a at a larger angle than the total reflection angle, the red component light penetrates through the surface 547a and is reflected on the surface 547b.

Further, the red component light emitted from the DMD 530R is reflected on the surface 547a.

The red component light reflected on the surface 547a and the surface 547b after being emitted from the DMD 530R enters the surface 547a at an angle smaller than the total reflection angle, and therefore the red component light penetrates the surface 547a.

The surface 547b is a dichroic filter surface that is penetrated by the green component light and that reflects the red component light. Therefore, among the light penetrated through the surface 545b, the green component light penetrates the surface 547b whereas the red component light is reflected on the surface 547b. The red component light reflected on the surface 547a is reflected on the surface 547b.

A prism 548 is formed of a light transmission member and includes a surface 549b. An air gap is provided between the prism 546 (surface 547b) and the prism 548 (surface 549b). Since the green component light emitted from the DMD 530G enters the surface 549b at an angle smaller than the total reflection angle, the green component light emitted from the DMD 530G penetrates the surface 549b.

The surface 549b is a dichroic filter surface that is penetrated by the green component light and that reflects the red component light. Therefore, the red component light reflected on the surface 547a after being emitted from the DMD 530R and the green component light emitted from the DMD 530G are combined on the surface 549b.

Further, the surface 547a is a dichroic filter surface that is penetrated by the red component light and the green component light, and that reflects the blue component light. Therefore, the blue component light reflected on the surface 545a after being emitted from the DMD 530B, and the red component light and the green component light combined on the surface 549b are combined on the surface 547a.

Here, on the surface 545b, the prism 544 separates the combined light including the red component light and the green component light, from the blue component light. The prism 546 separates the red component light and the green component light by the surface 547b. In other words, the prism 544 and the prism 546 function as a color separating element which separates each color component light.

Meanwhile, on the surface 545b, the prism 544 combines the combined light including the red component light and the green component light, and the blue component light. The prism 546 combines, on the surface 547b, the red component light and the green component light. In other words, the prism 544 and the prism 546 function as color combining elements which combines each color component light.

The red component light, the green component light, and the blue component light combined on the surface 547a enter the surface 545a and the plane 543a at an angle smaller than the total reflection angle. Thus, the red component light, the green component light, and the blue component light which are combined (i.e., the image light), penetrates the TIR prism 540 and the prism 542, and are emitted toward the projection lens unit 550.

The projection lens unit 550, on a screen or the like, projects the combined light (image light) emitted from the TIR prism 540.

In the second embodiment, the light source units 510, the rod integrators 520, and the like constitute the "lighting unit." Note that the lighting unit does not include the DMDs 530, the TIR prism 540, and the projection lens unit 550. However, the lighting unit may have a configuration including other optical elements (for example, condenser lenses).

(Function of the Projection Display Apparatus)

Figure 12:
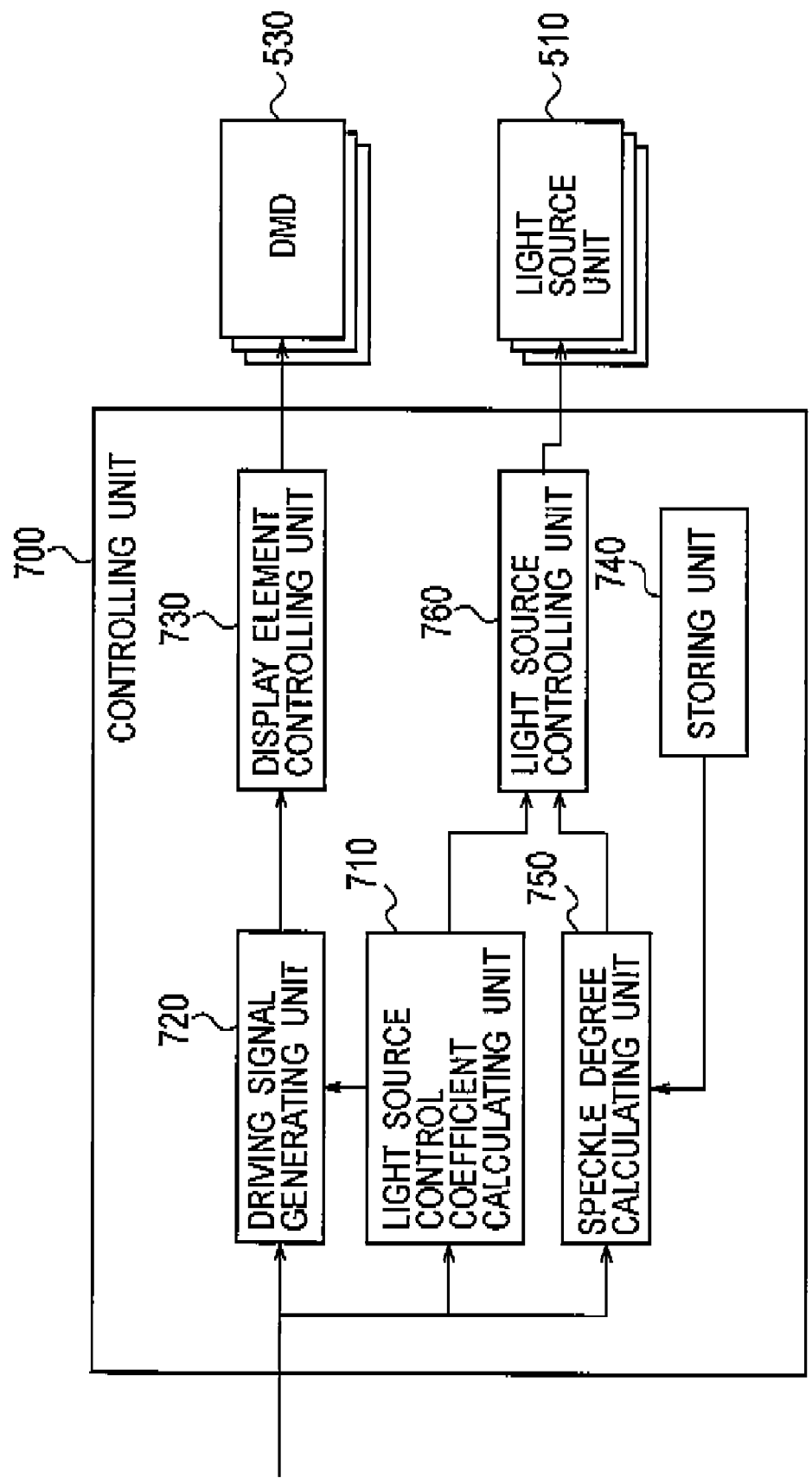
FIG. 12 is a block diagram showing a function of the projection display apparatus 600 according to the second embodiment.

Functions of the projection display apparatus (lighting unit) according to the second embodiment will be explained below with reference to the accompanying drawings. FIG. 12 is a block diagram showing functions of the projection display apparatus 600 (controlling unit 700) according to the second embodiment.

In a similar way as the first embodiment, the controlling unit 700 acquires an image input signal, and controls the light amount of the color component lights emitted from the light source units 510, in accordance with the image input signal. To be more specific, as shown in FIG. 12, the controlling unit 700 includes a light source control coefficient calculating unit 710, a driving signal generating unit 720, a display element controlling unit 730, a storing unit 740, a speckle degree calculating unit 750, and a light source controlling unit 760.

On the contrary to the first embodiment, the display element controlling unit 730 controls each of the DMDs 530 in accordance with the image output signal (driving signal). The storing unit 740 stores, for each color component light, a hue speckle degree that indicates a degree to which the color component lights emitted from the light source units 510 generate a speckle, for each hue. Note that the hue speckle degree changes depending on the solid state light sources which constitute the light source units 510.

(Calculation of the Hue Speckle Degree)

Hereinbelow, with reference to FIGS. 13A and 13B to 15A and 15B, a description will be given for a calculation of a speckle degree (hue speckle degrees R, G, and B), for each hue, which indicates a degree to which each color component lights emitted from the light source units 510 generate the speckle.

For the measurement of the hue speckle degree R, the degree to which a speckle appears for each hue is measured under the condition where only the light source unit 510R of the red component light among the light source units 510 is turned on, as well as a white light source (xenon lamp) is turned on. A hue R means that the signal of (R, G, B)=(255, 0, 0) is outputted to the DMDs 530. Similarly, a hue Ye is (255, 255, 0), a hue G is (0, 255, 0), a hue Cy (0, 255, 255), a hue B is (0, 0, 255), and a hue Mg is (255, 0, 255).

Figure 13A:
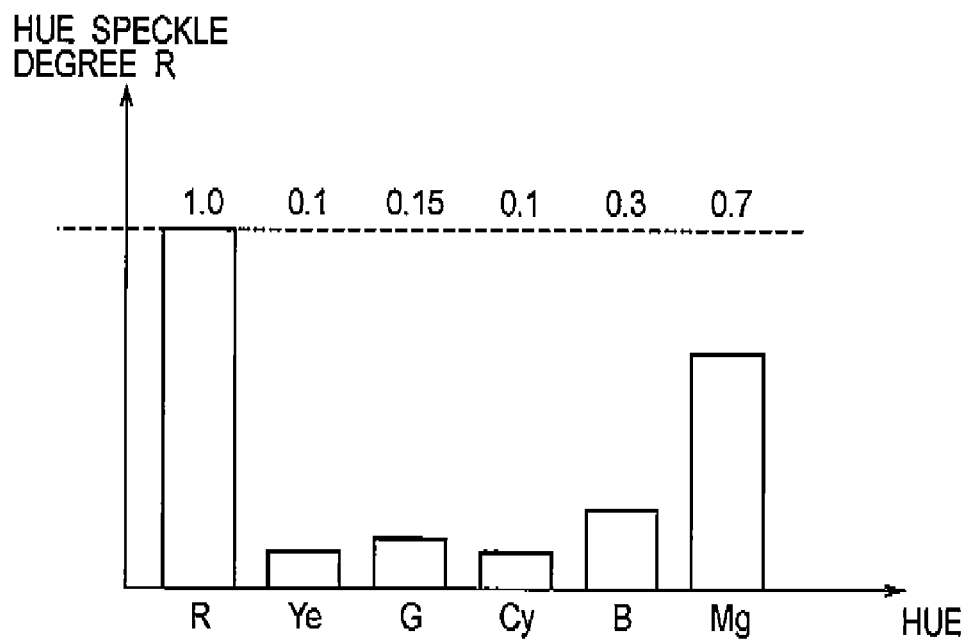
FIGS. 13A and 13B are graphs each showing an example of a hue speckle degree R according to the second embodiment.

FIG. 13A is a graph showing the hue speckle degree R acquired through a speckle contrast measurement. A hue value showing the maximum speckle contrast is set to "1", and the relative speckle degree for each hue when the light source unit 510R of the red component light is turned on is shown. The plurality of solid state light sources which constitute the light source unit 510R differ from the solid state light sources (10-1 R to 10-6R) which constitute the light source unit 10R in the first embodiment, but show the same characteristic as the light source unit 10R of the first embodiment, as shown in FIG. 13A.

Figure 13B:
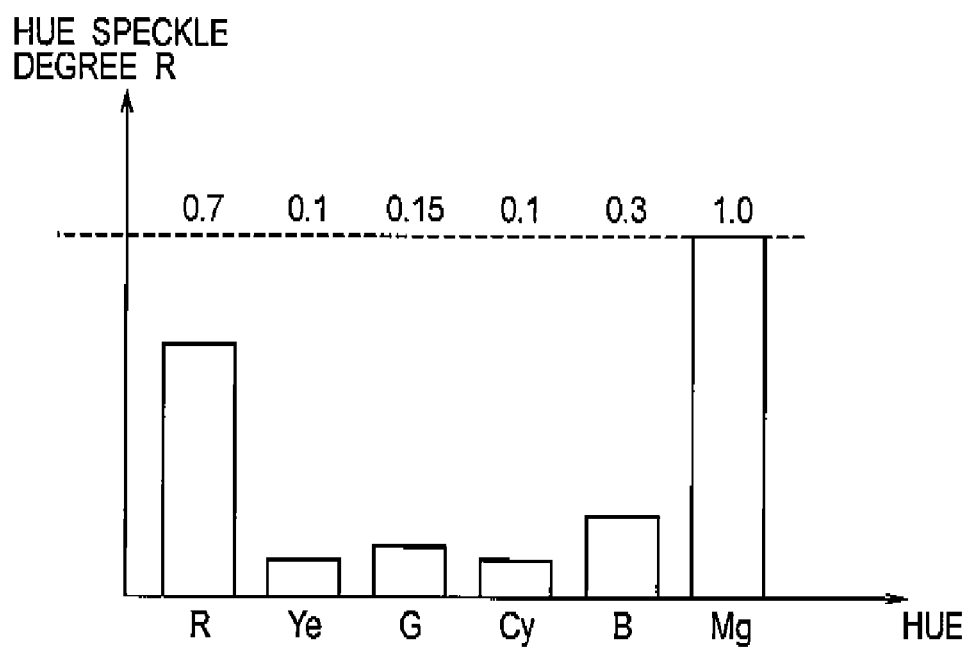

FIG. 13B is a graph showing the hue speckle degree R acquired through a subjective evaluation. The characteristic by the subjective evaluation also shows the same characteristic as the light source unit 10R of the first embodiment, as shown in FIG. 13B.

Figure 14A:
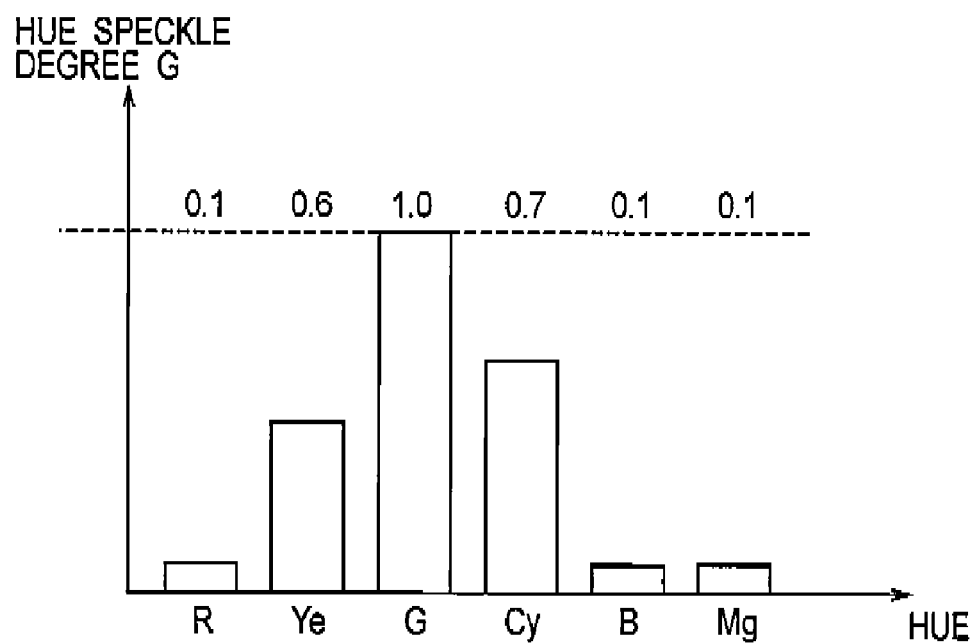
FIGS. 14A and 14B are graphs each showing an example of a hue speckle degree G according to the second embodiment.

FIG. 14A is a graph showing the hue speckle degree G acquired through the speckle contrast measurement. For the measurement of the hue speckle degree G, the degree to which a speckle appears for each hue is measured under the condition where only the light source unit 510G of the green component light among the light source units 510 is turned on, as well as the white light source (xenon lamp) is turned on. FIG. 14 A shows an example in which the hue value which shows the maximum speckle contrast is set to "1," and the relative speckle degree for each hue when the light source unit 510G of the green component light is turned on.

As shown in FIG. 14A, the hue speckle degree G is the highest in the green hue G, and the hue speckle degree G is the second highest in the yellow hue Ye and the cyan hue Cy. On the other hand, the hue speckle degree G is relatively low in the red hue R, the blue hue B, and the magenta hue Mg.

Figure 14B:
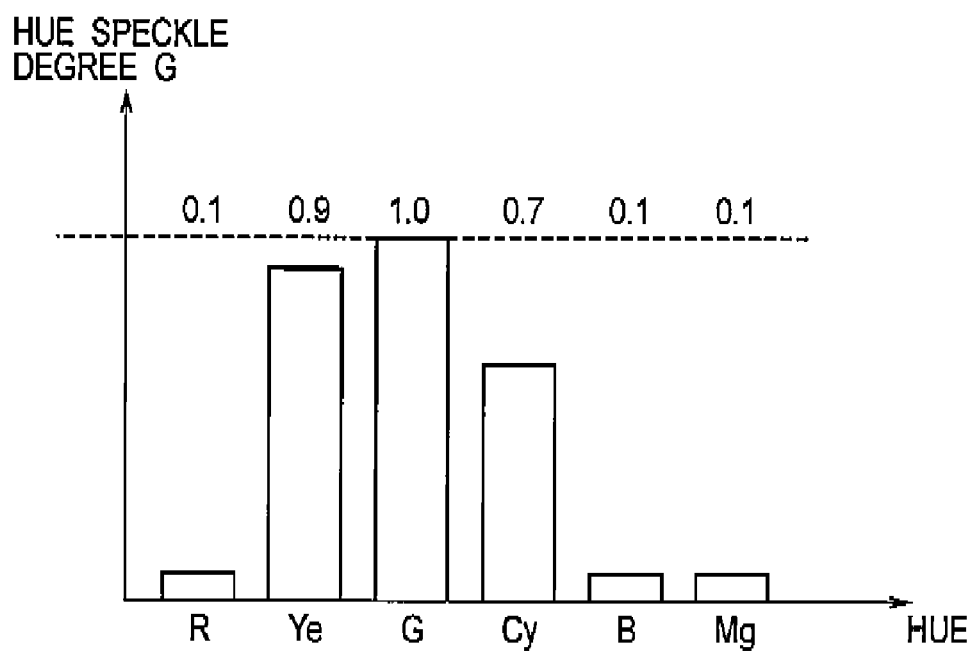

FIG. 14B is a graph showing the hue speckle degree G acquired through the subjective evaluation. As shown in FIG. 14B, the hue speckle degree G is the highest in the green hue G, and the hue speckle degree G is the second highest in the yellow hue Ye. On the other hand, the hue speckle degree G is relatively low in the red hue R, the blue hue B, and the magenta hue Mg.

Figure 15A:
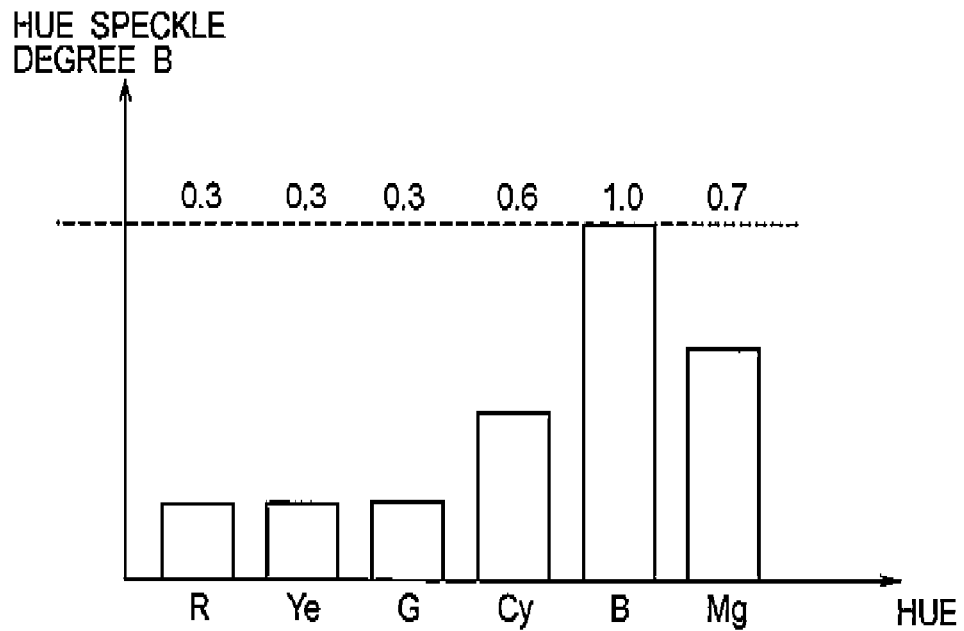
FIGS. 15A and 15B are graphs each showing an example of a hue speckle degree B according to the second embodiment.

FIG. 15A is a graph showing the hue speckle degree B acquired through the speckle contrast measurement. For the measurement of the hue speckle degree B, the degree to which a speckle appears for each hue is measured under the condition where only the light source unit 510B of the blue component light among the light source units 510 is turned on, as well as the white light source (xenon lamp) is turned on. The hue value which shows the maximum speckle contrast is set to "1", and the relative speckle degree for each hue when the light source unit 510B of the blue component light is turned on is shown.

As shown in FIG. 15A, the hue speckle degree B is the highest in the blue hue B, and the hue speckle degree B is the second highest in the cyan hue Cy and the magenta hue Mg. On the other hand, the hue speckle degree B is relatively low in the red hue R, the yellow hue Ye, and the green hue G.

Figure 15B:
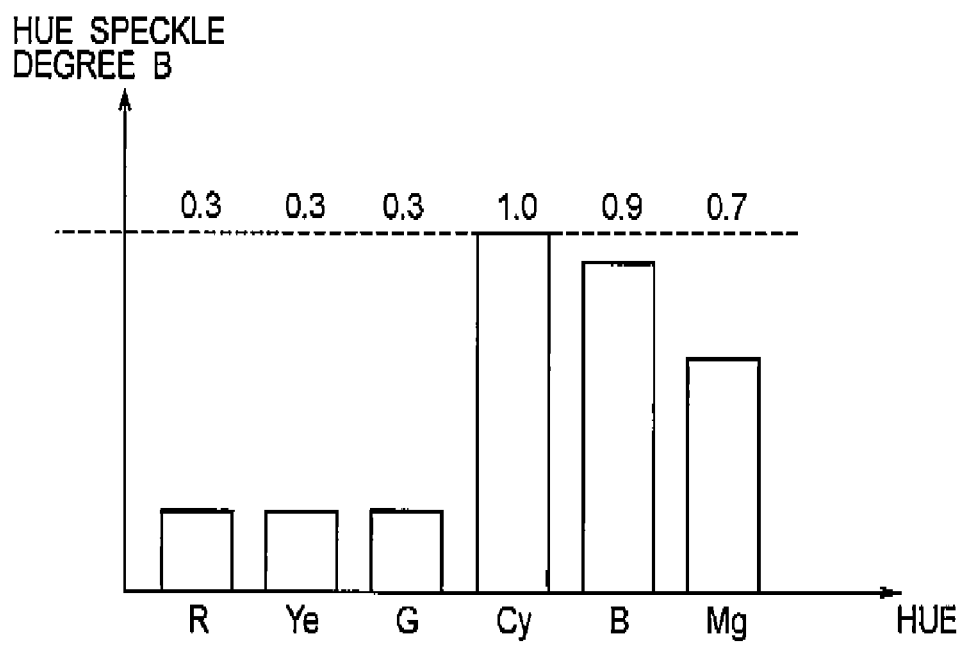

FIG. 15B is a graph showing the hue speckle degree B acquired through the subjective evaluation. As shown in FIG. 15B, the hue speckle degree B is the highest in the cyan hue Cy, and the hue speckle degree B is the second highest in the blue hue B. On the other hand, the hue speckle degree B is relatively low in the red hue R, the yellow hue Ye, and the green hue G.

Next, a degree (hue speckle degree RGB) to which the lights emitted from the light source units 510 generate a speckle, for each hue, will be explained below with reference to FIGS. 16A and 16B.

Figure 16A:
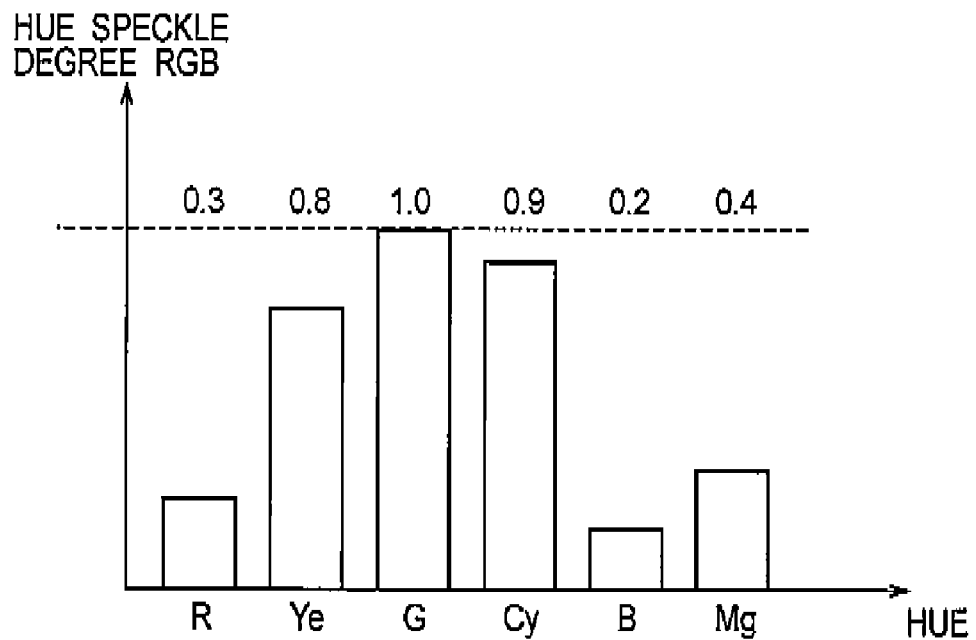
FIGS. 16A and 16B are graphs each showing an example of a hue speckle degree RGB according to the second embodiment.

As shown in FIG. 16A, the hue speckle degree RGB is the highest in the green hue G, and the hue speckle degree RGB is the second highest in the yellow hue Ye and the cyan hue Cy. On the other hand, the hue speckle degree RGB is relatively low in the blue hue B, the red hue R, and the magenta hue Mg.

Since the light source unit 510G of the green component light has a large light amount, it is observed that the hue speckle degree RGB tends to become high in the hue affected by the light source unit 510G. Although the hue value indicating the maximum speckle contrast is set to "1" in FIGS. 13A and 13B to 15A and 15B, the blue, in which the speckle contrast is small, has a low hue speckle degree RGB as an actual measured value.

Figure 16B:
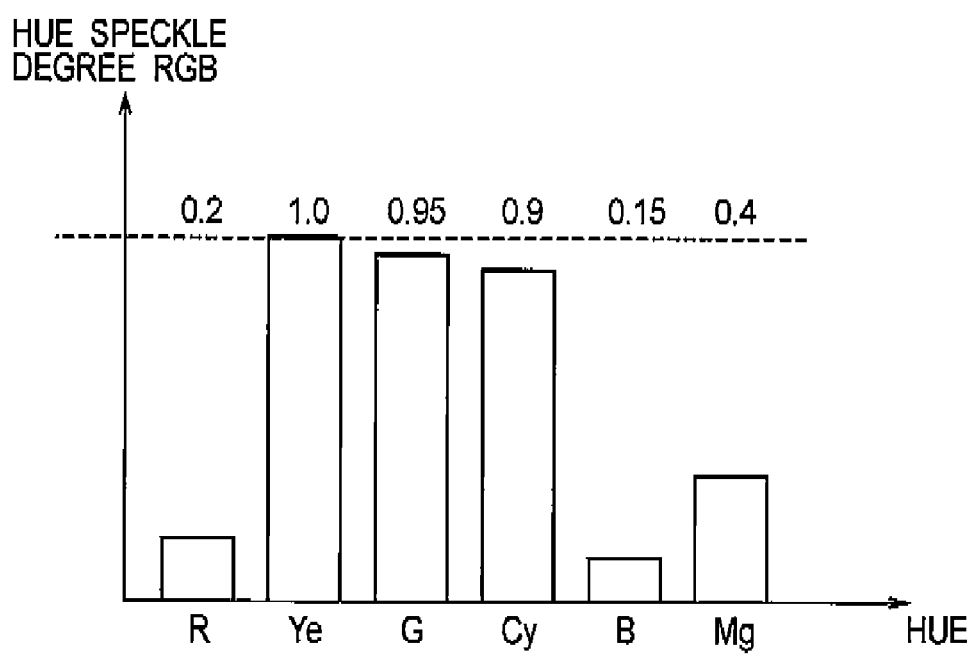

FIG. 16B is a graph showing the hue speckle degree RGB acquired through the subjective evaluation. As shown in FIG. 16B, according to the subjective evaluation, the hue speckle degree RGB is the highest in the yellow hue Ye, and the hue speckle degree RGB is the second highest in the green hue G and the cyan hue Cy. On the other hand, the hue speckle degree RGB is relatively low in the blue hue B, the red hue R, and the magenta hue Mg.

Nonetheless, from FIGS. 13A and 13B to 16A and 16B it can be observed that significant difference cannot be found between the hue speckle degree through the measurement and the hue speckle degree through the subjective evaluation. Consequently, the controlling unit 700 may include a sensor which measures a speckle contrast, and may make the storing unit 740 store the hue speckle degree that is calibrated when displaying an image, or may make the storing unit 740 store the hue speckle degree in the process of production as in the first embodiment.

Other Embodiment

Although the present invention has been explained by the above-described embodiments, it should be understood that the present invention is not limited to the descriptions and the drawings which make a part of this disclosure. Various alternative embodiments, examples, and operational techniques will be apparent to a person skilled in the art from this disclosure.

In the above-described embodiments, the fly-eye lens units 20 are used as means for uniformizing the lights emitted from the light source units 10. Alternatively, a tapered rod may be used.

In the above-described embodiments, although the liquid crystal panel 30 is used as display units, it is not limited to this. LCOS (Liquid Crystal on Silicon) or the like may be used as the display unit.

In the above-described embodiments, although each of the light source units 10 is controlled according to the speckle degree calculated for each color component light, it is not limited to this. All the light source units 10 may be controlled in accordance with the speckle degree common to each color component light (for example, an average value, a maximum value a minimum value, or the like of the speckle degree calculated for each color component light).

The first embodiment to the second embodiment may be combined together. Specifically, the controlling unit 200 may change the control ratio between the first control mode and the second control mode, in accordance with a combination of any two of or all of the speckle degree acquired based on the hue distribution and the hue speckle degree, the speckle degree acquired based on the saturation distribution and the saturation speckle degree, and the speckle degree acquired based on the luminance distribution and the luminance speckle degree.

What is claimed is:

1. A lighting unit provided with a light source unit having a plurality of solid state light sources that emits same color component lights, the lighting unit comprising:
   a light source controlling unit configured to control, in accordance with an image input signal, a light amount of the same color component lights emitted from the plurality of solid state light sources, and
   an acquiring unit configured to acquire, in accordance with the image input signal, a speckle degree that indicates a degree to which the same color component lights generate a speckle in an image, wherein
   the light source controlling unit includes:
   a first control mode that averagely lowers the light amount of the same color component lights emitted from the plurality of solid state light sources, and
   a second control mode that preferentially lowers a light amount of a same color component light emitted from a solid state light source that has an unfavorable light emission efficiency among the plurality of solid state light sources, and
   the light source controlling unit changes a control ratio between the first control mode and the second control mode, in accordance with the speckle degree acquired by the acquiring unit.

2. The lighting unit according to claim 1, further comprising a storing unit configured to store, for each hue, a hue speckle degree that indicates a degree to which the same color component lights generate the speckle, wherein
   the acquiring unit acquires, in accordance with the image input signal, a hue distribution included in the image, and acquires the speckle degree, based on the hue distribution and the hue speckle degree.

3. The lighting unit according to claim 1, further comprising a storing unit configured to store, for each saturation, a saturation speckle degree that indicates a degree to which the same color component lights generate the speckle, wherein;
   the acquiring unit acquires, in accordance with the image input signal, a saturation distribution included in the image, and acquires the speckle degree, based on the saturation distribution and the saturation speckle degree.

4. The lighting unit according to claim 1, further comprising a storing unit configured to store, for each luminance, a luminance speckle degree that indicates a degree to which the same color component lights generate the speckle, wherein;
   the acquiring unit acquires, in accordance with the image input signal, a luminance distribution included in the image, and acquires the speckle degree, based on the luminance distribution and the luminance speckle degree.

5. A projection display apparatus, comprising:
   the lighting unit according to claim 1;
   a display unit on which lights emitted from the lighting unit is irradiated; and
   a projection unit that projects the lights emitted from the display unit.

6. The projection display apparatus according to claim 5, wherein the display unit is a reflection type display unit.

* * * * *

UNITED STATES PATENT AND TRADEMARK OFFICE
CERTIFICATE OF CORRECTION

PATENT NO. : 8,011,792 B2
APPLICATION NO. : 12/340827
DATED : September 6, 2011
INVENTOR(S) : Masutaka Inoue et al.

It is certified that error appears in the above-identified patent and that said Letters Patent is hereby corrected as shown below:

Title Page, Inventors should read
(75) Inventors: Masutaka Inoue, Hirakata-shi (JP)
Tomoya Terauchi, Daito-shi (JP)

Signed and Sealed this
Eighteenth Day of October, 2011

David J. Kappos
*Director of the United States Patent and Trademark Office*